(12) United States Patent
Viswanath et al.

(10) Patent No.: US 10,657,389 B2
(45) Date of Patent: *May 19, 2020

(54) STATIONARY-VEHICLE STRUCTURE FROM MOTION

(71) Applicant: TEXAS INSTRUMENTS INCORPORATED, Dallas, TX (US)

(72) Inventors: Prashanth Ramanathpur Viswanath, Karnataka (IN); Soyeb Nagori, Karnataka (IN); Manu Mathew, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,542

(22) Filed: Jun. 7, 2019

(65) Prior Publication Data

US 2019/0286919 A1 Sep. 19, 2019

Related U.S. Application Data

(63) Continuation of application No. 16/121,012, filed on Sep. 4, 2018, now Pat. No. 10,354,149, which is a (Continued)

(30) Foreign Application Priority Data

Dec. 29, 2015 (IN) .......................... 7027/CHE/2015

(51) Int. Cl.
*G06K 9/00* (2006.01)
*H04N 7/18* (2006.01)
(Continued)

(52) U.S. Cl.
CPC ....... *G06K 9/00791* (2013.01); *G06K 9/4604* (2013.01); *G06T 7/269* (2017.01);
(Continued)

(58) Field of Classification Search
USPC .......... 382/100, 103–107, 122–23, 154–155, 382/162, 168, 172–173, 181, 199, 206, (Continued)

(56) References Cited

U.S. PATENT DOCUMENTS 9,097,800 B1 * 8/2015 Zhu ...................... G01S 13/865
2013/0141580 A1 * 6/2013 Stein .................. G06K 9/00798
348/148

(Continued)

*Primary Examiner* — Seyed H Azarian
(74) *Attorney, Agent, or Firm* — Brian D. Graham; Charles A. Brill; Frank D. Cimino

(57) ABSTRACT

A vehicular structure from motion (SfM) system can store a number of image frames acquired from a vehicle-mounted camera in a frame stack according to a frame stack update logic. The SfM system can detect feature points, generate flow tracks, and compute depth values based on the image frames, the depth values to aid control of the vehicle. The frame stack update logic can select a frame to discard from the stack when a new frame is added to the stack, and can be changed from a first in, first out (FIFO) logic to last in, first out (LIFO) logic upon a determination that the vehicle is stationary. An optical flow tracks logic can also be modified based on the determination. The determination can be made based on a dual threshold comparison to insure robust SfM system performance.

20 Claims, 15 Drawing Sheets

Related U.S. Application Data continuation of application No. 15/235,516, filed on Aug. 12, 2016, now Pat. No. 10,108,864.

(51) Int. Cl.
  *G06K 9/46* (2006.01)
  *G06T 7/579* (2017.01)
  *G06T 7/269* (2017.01)

(52) U.S. Cl.
  CPC .... *G06T 7/579* (2017.01); *G06T 2207/30244* (2013.01); *G06T 2207/30252* (2013.01)

(58) Field of Classification Search
  USPC ....... 382/219, 232, 254, 274, 276, 286, 293, 382/305, 321, 291; 701/23, 28; 348/148
  See application file for complete search history.

(56) References Cited

U.S. PATENT DOCUMENTS

2014/0330479 A1* 11/2014 Dolgov ................ G01S 13/867
  701/28
2015/0266472 A1* 9/2015 Ferguson ........... G01C 21/3461
  701/23
2016/0357187 A1* 12/2016 Ansari ................. G01S 15/931

* cited by examiner

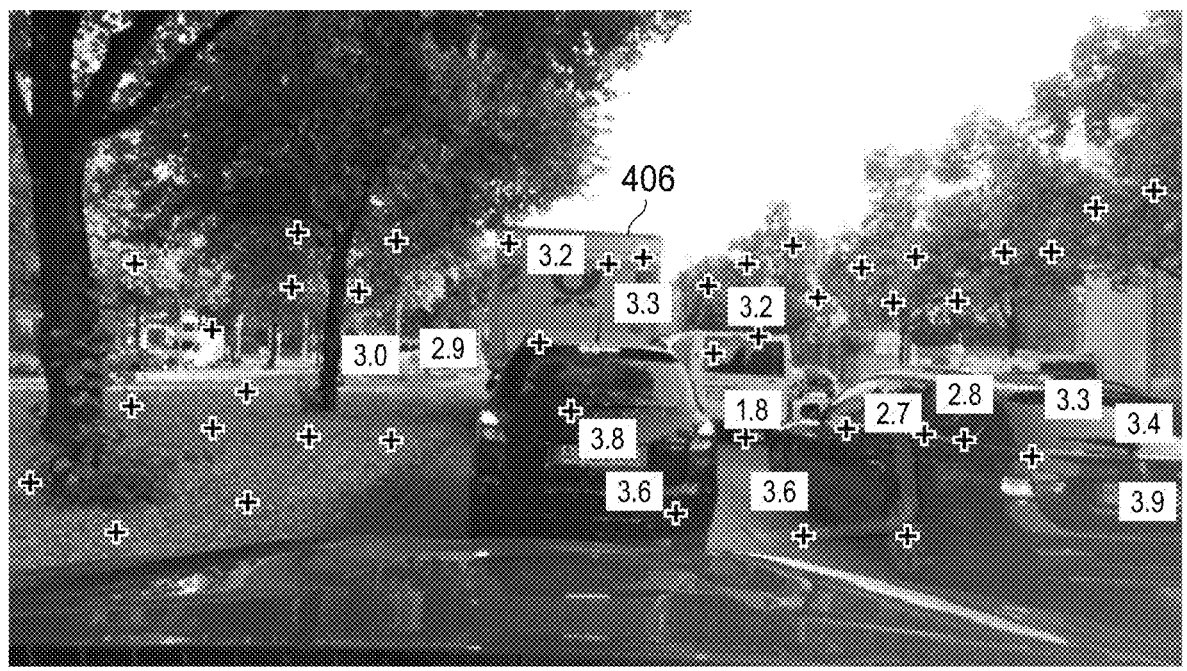
FIG. 4A
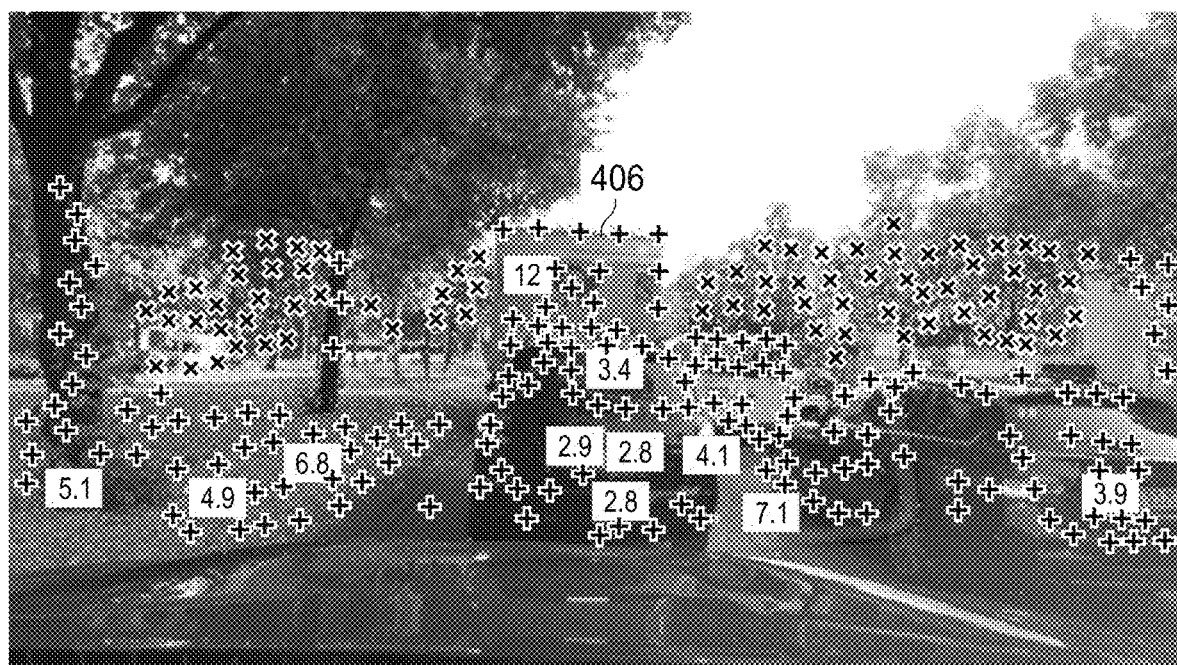
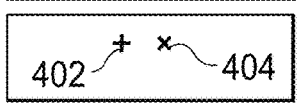
FIG. 4B

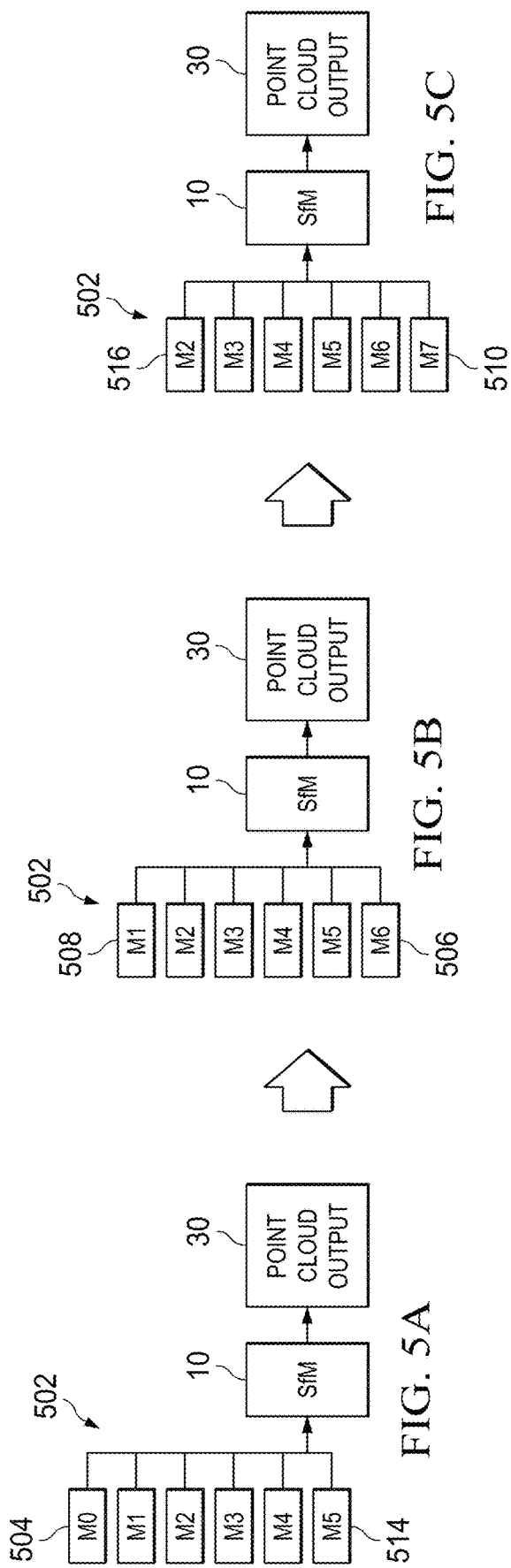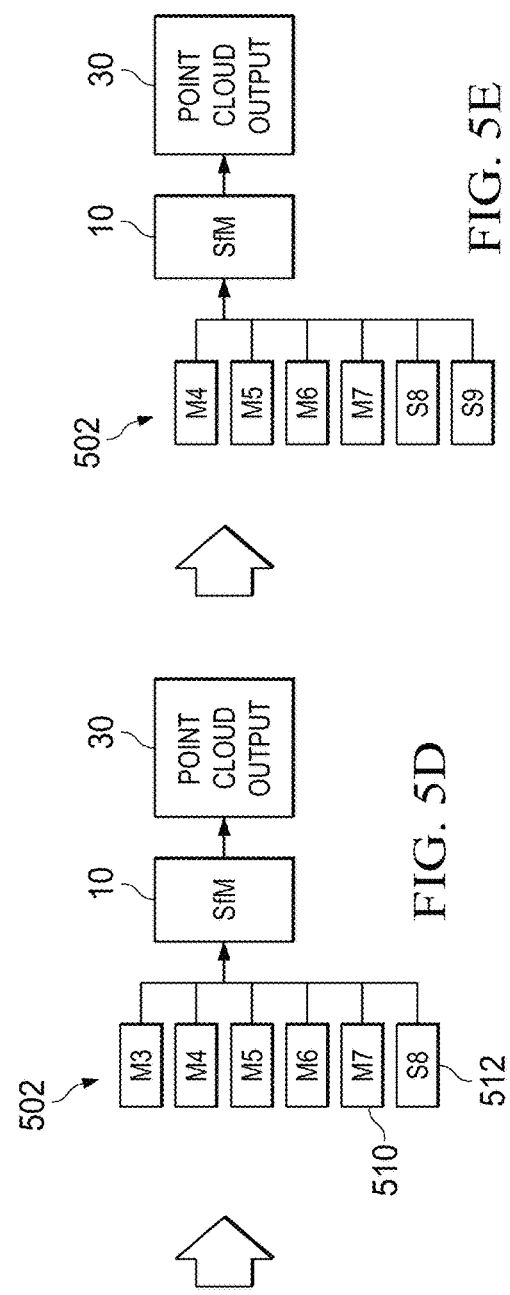

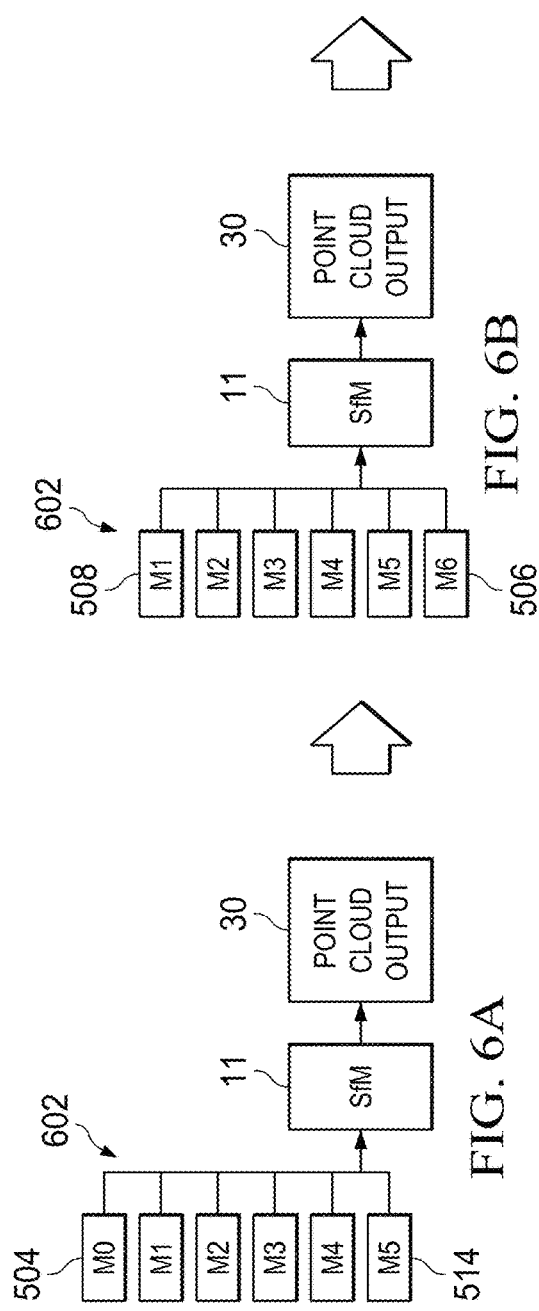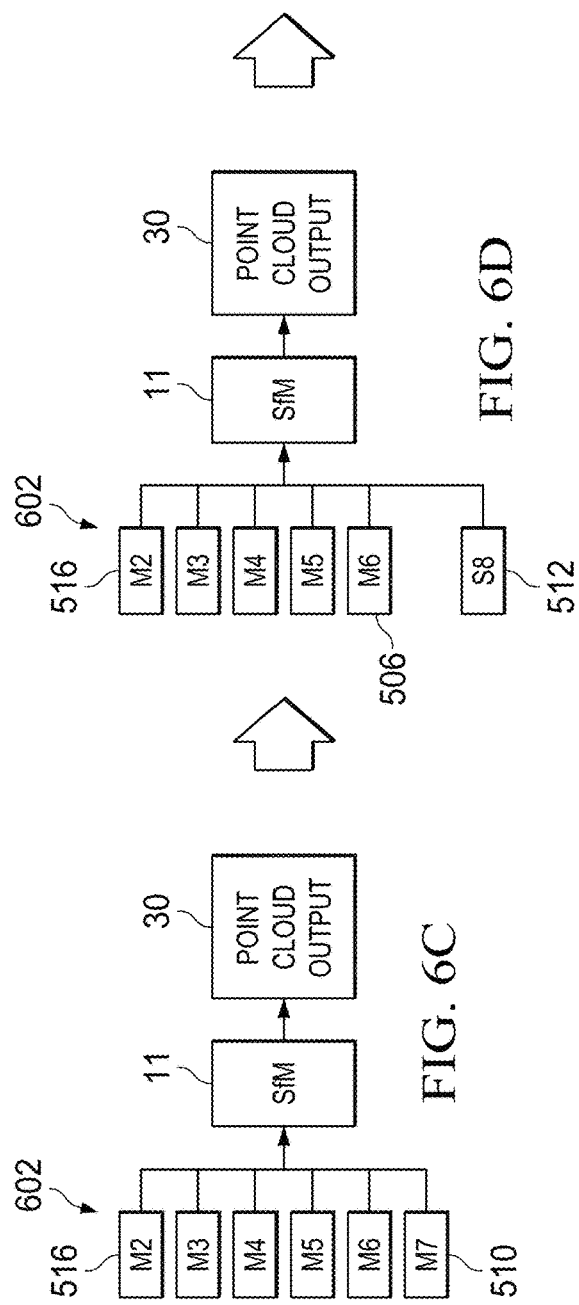

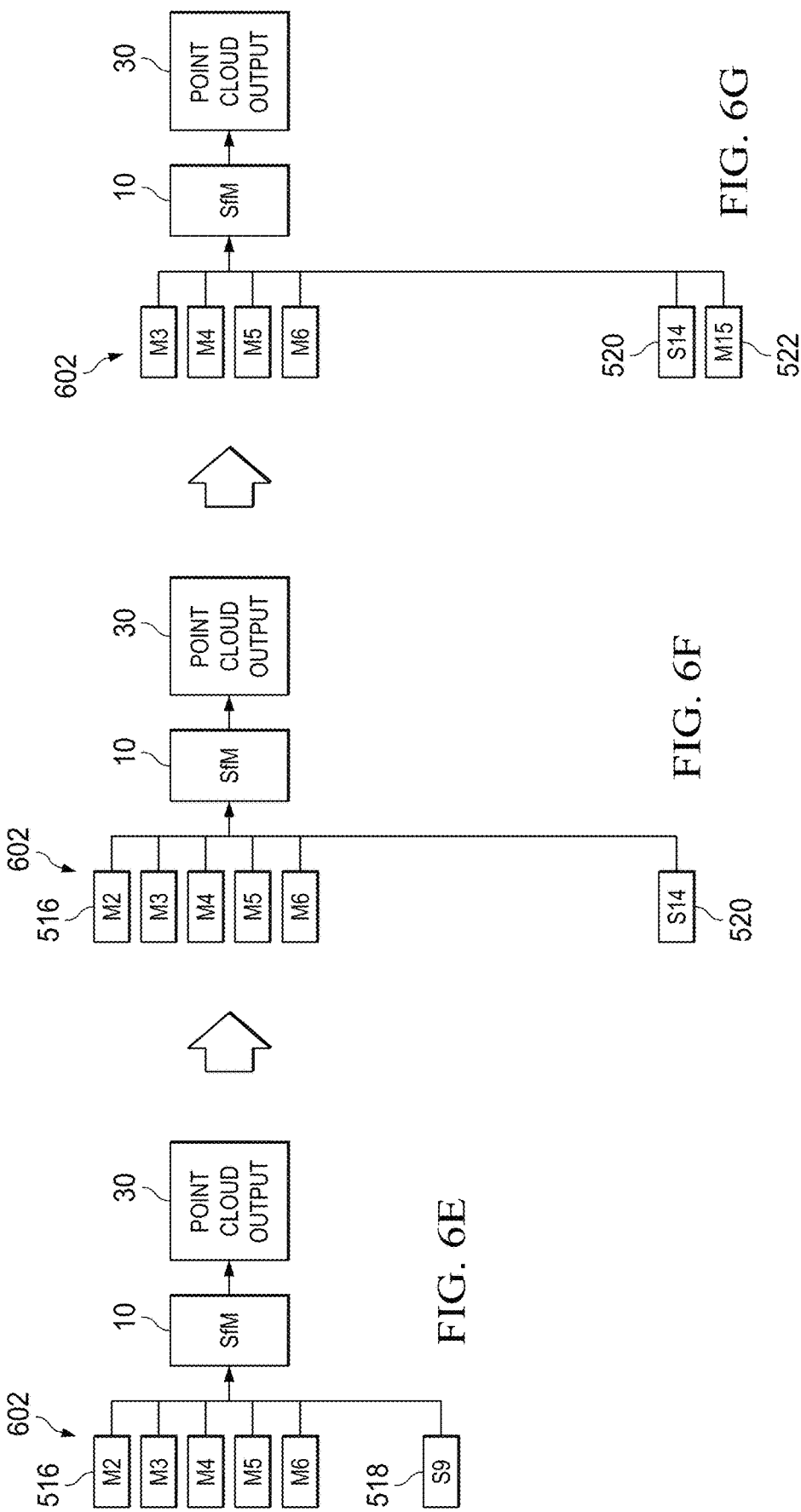

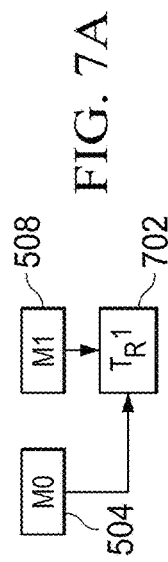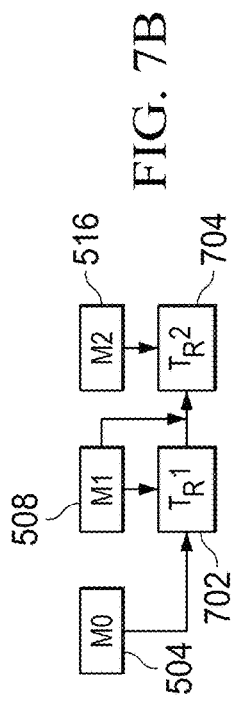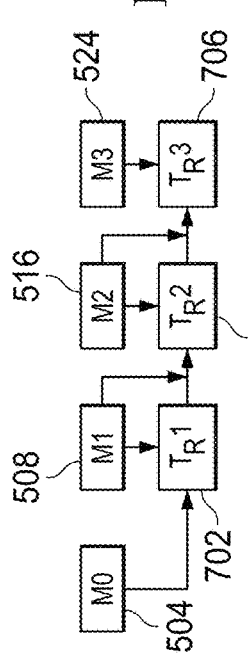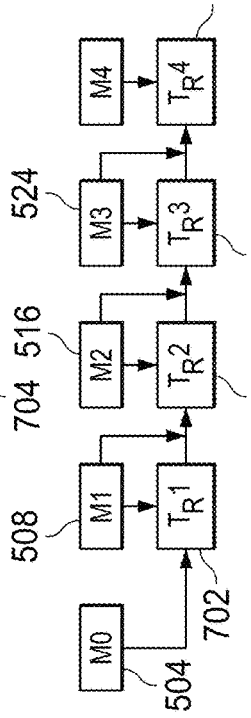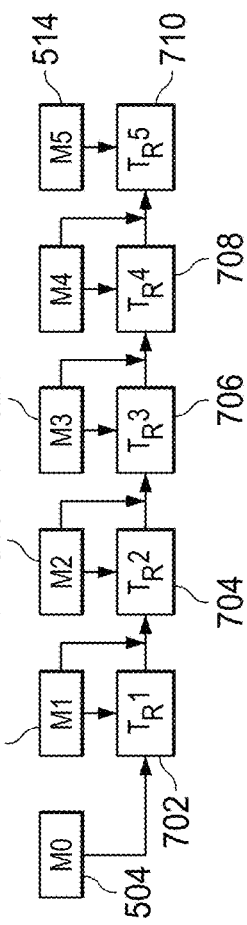

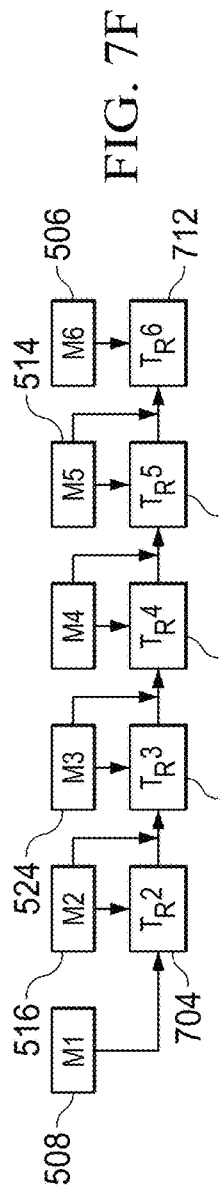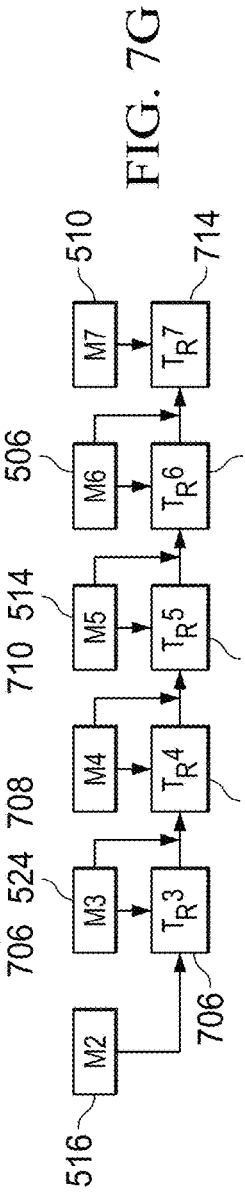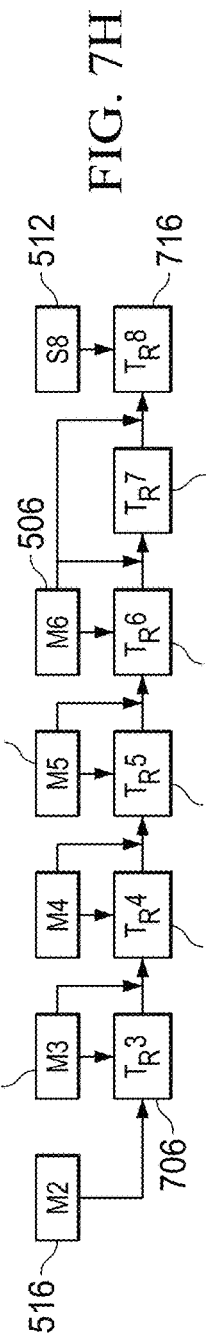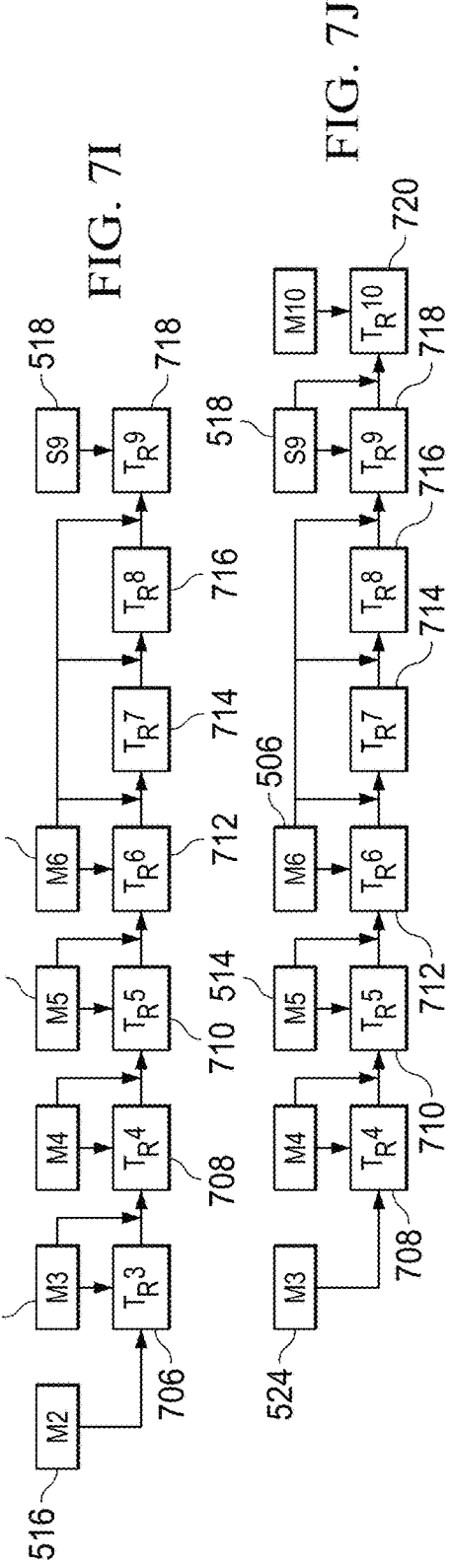

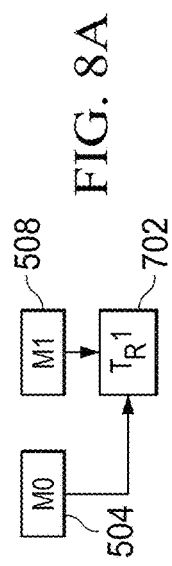
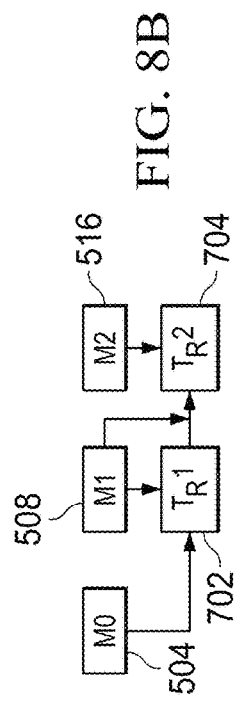
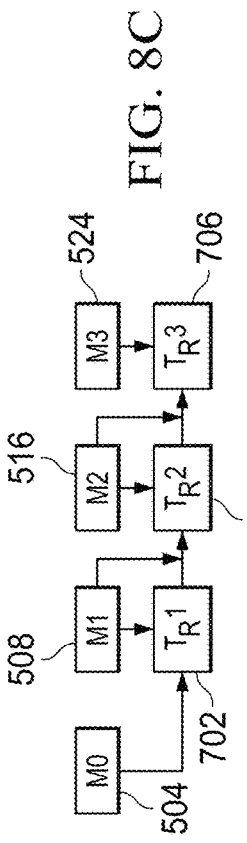
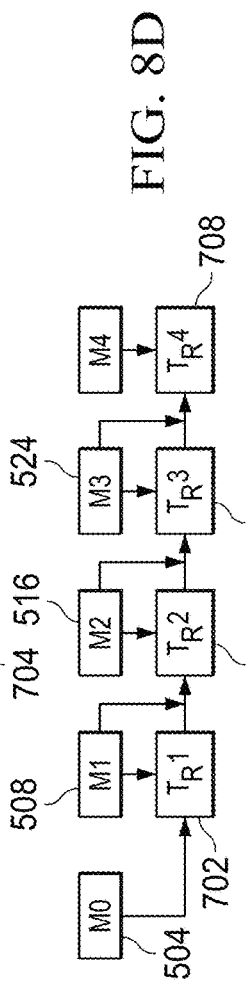
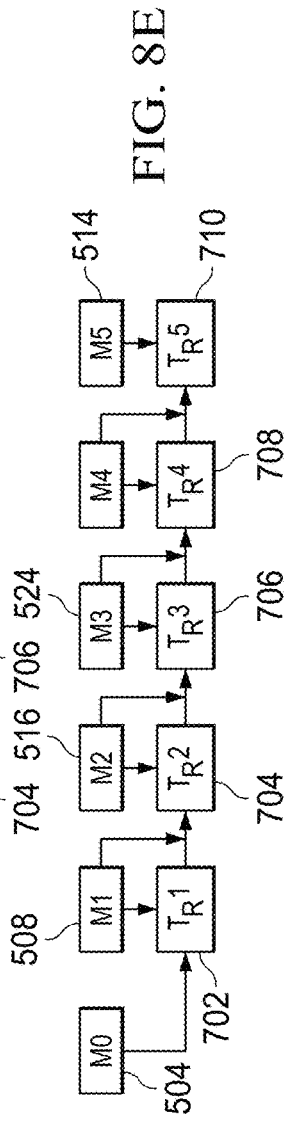

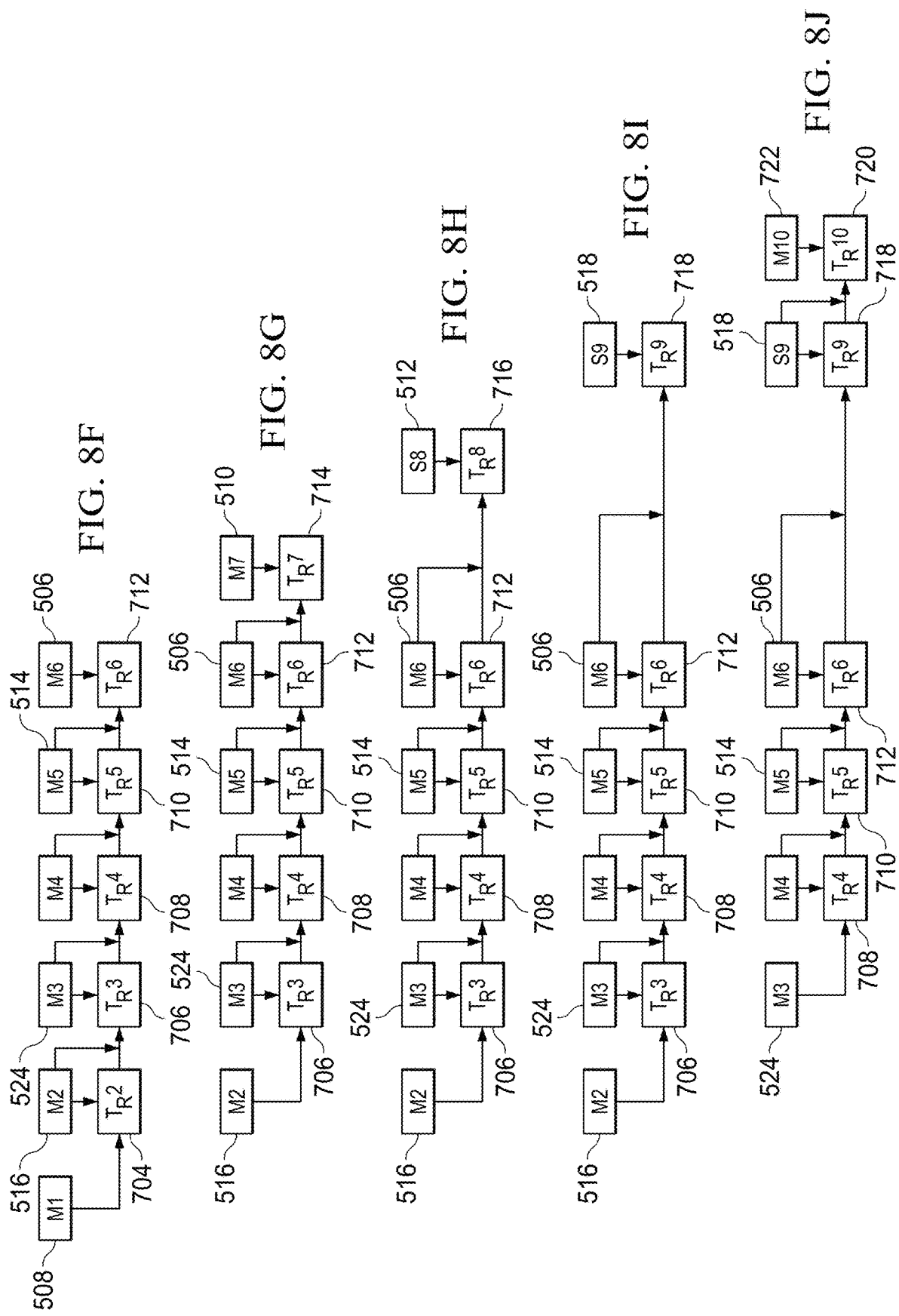

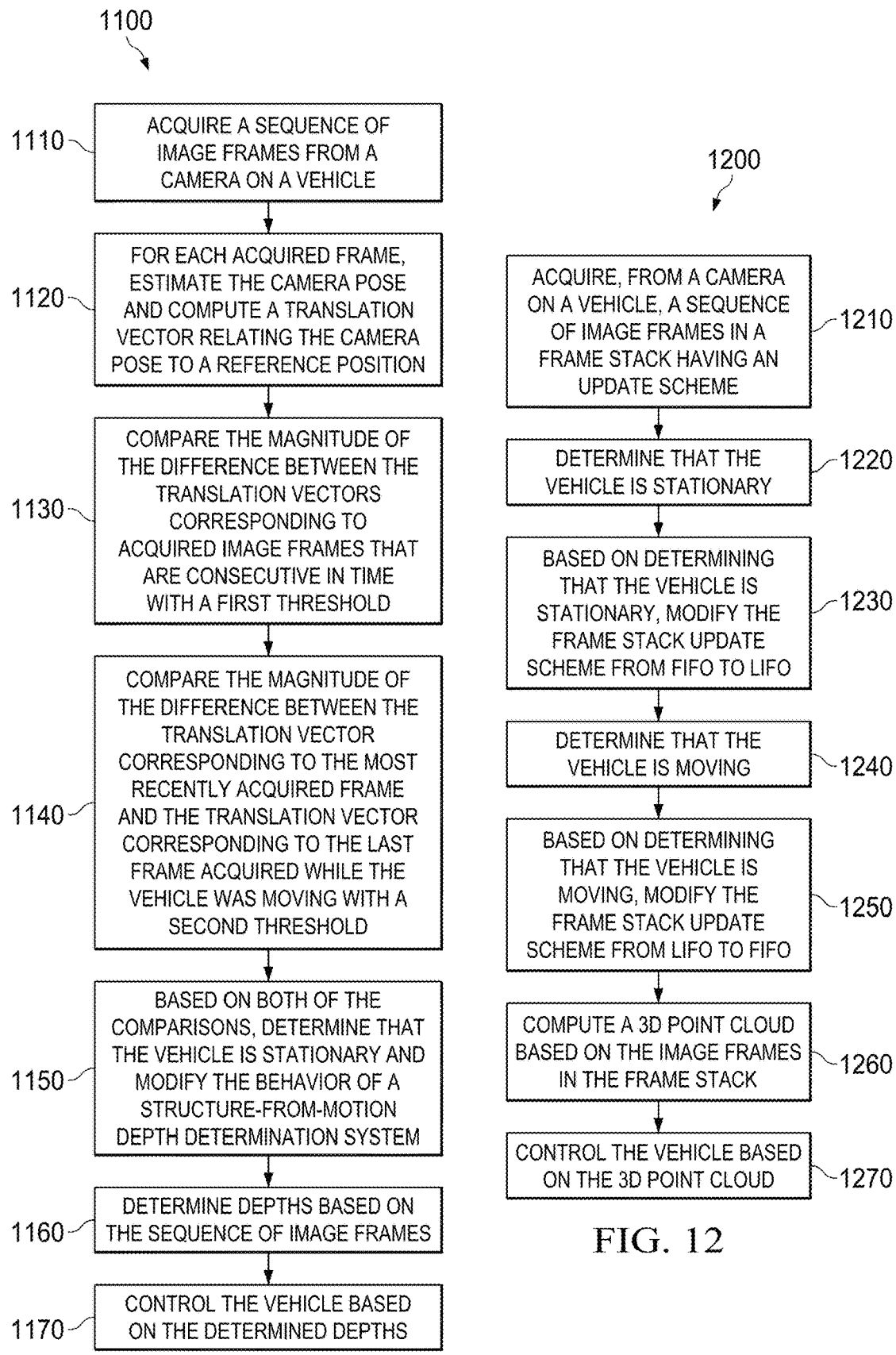

STATIONARY-VEHICLE STRUCTURE FROM MOTION

CROSS-REFERENCE TO RELATED APPLICATION

This application is a continuation of U.S. patent application Ser. No. 16/121,012, filed Sep. 4, 2018, which is a continuation of U.S. patent application Ser. No. 15/235,516, now U.S. Pat. No. 10,108,864, filed on Aug. 12, 2016, which claims priority to Indian provisional patent application No. 7027/CHE/2015, filed in the Indian Patent Office on Dec. 29, 2015, each of which is hereby incorporated by reference herein in its entirety.

TECHNICAL FIELD

This disclosure relates to computer vision systems and methods. More particularly, this disclosure relates to systems and methods for providing structure-perceptive vision to vehicles for autonomous or driver-assisted navigation. This disclosure particularly relates to stationary-vehicle structure from motion.

BACKGROUND

Structure from motion (SfM) is a range imaging technique for estimating three-dimensional (3D) structures from two-dimensional (2D) image sequences from a single camera. Because it can recover 3D information from a single, inexpensive camera, it can be a cost-effective solution as compared to stereo imaging systems or range sensors like lidar or automotive radar. SfM can also increase the robustness of advanced driver assistance systems (ADAS) while working in tandem with other sensors, such as radar, to provide automatic emergency braking (AEB).

However, when a camera used as part of a structure-from-motion system is stationary, the captured 2D image sequences can appear the same, and thus may fail to provide information regarding 3D structure. Under such conditions, SfM fails to recover 3D range information, generally described by of a set of points in 3D space, from the 2D image sequences. Consequently, in automotive scenario having an outward-looking camera placed inside the vehicle, SfM may not be useful when the vehicle is not moving.

Prior approaches for obtaining SfM in stationary scenarios carry forward the point cloud generated when the camera was moving. Such approaches sometimes account for objects moving into and out of a stationary-camera scene by applying background subtraction or other segmentation techniques to preserve the 3D points pertaining to the background. Although such techniques may be able to handle cases involving the removal of 3D points where a new object has come in the scene, they may not be able to handle cases requiring the addition of 3D points in regions of the scene where objects have moved out of the scene.

SUMMARY

This disclosure relates to systems and methods for obtaining structure from motion (SfM) in stationary vehicles. The disclosed systems and methods use a novel technique to provide 3D information even when the camera is not moving.

In an example, a vehicular structure from motion (SfM) system can include an input to receive a sequence of image frames acquired from a camera on a vehicle, a memory to store a finite number of the frames in a frame stack according to a frame stack update logic, and one or more processors to implement the frame stack update logic, detect feature points, generate optical flow tracks, and compute depth values based on the image frames, the depth values to aid control of the vehicle. The frame stack update logic can select a frame to discard from the stack when a new frame is added to the stack. The frame stack update logic can be changed from a first in, first out (FIFO) logic to last in, first out (LIFO) logic upon a determination that the vehicle is stationary. Similarly, the frame stack update logic can be changed from the LIFO logic back to the FIFO logic upon a determination that the vehicle is moving.

One or more processors can implement an optical flow tracks logic to prune optical flow tracks generated from corresponding feature points in different frames. Upon a determination that the vehicle is stationary, the optical flow tracks logic can be changed from pruning based on the last-computed set of tracks to pruning based on the last set of tracks computed from a frame acquired while the vehicle was moving. Similarly, upon a determination that the vehicle is moving again, the optical flow tracks logic can be changed from pruning based on the last set of tracks computed from a frame acquired while the vehicle was moving to pruning based on the last-computed set of tracks. By "last-computed set of tracks," what is meant is the set of tracks computed from feature points in a plurality of frames immediately prior to the most recently computed set of tracks being pruned.

The determination that the vehicle is stationary can be made by the one or more processors or by another component, which can make the determination by estimating the pose of the camera and computing a translation vector relating the camera pose to a reference position, and then making two comparisons.

In the first comparison, a first value can be compared with a first threshold, the first value being the magnitude of the difference between the translation vectors corresponding to acquired image frames that are consecutive in time. In the second comparison, a second value can be compared with a second threshold, the second value being the magnitude of the difference between the translation vector corresponding to the most recently acquired frame and the translation vector corresponding to the last frame acquired while the vehicle was moving.

The vehicle can then be determined to be stationary based on both the first and second comparisons. For example, the vehicle can be considered to be stationary when at least one of the following conditions is met: the first value is less than the first threshold, or the second value is less than the second threshold. If neither condition is met, the vehicle can be determined to be moving.

In another example, a method for SfM-based control of a vehicle can begin with acquiring, from a camera on a vehicle, a sequence of image frames in a frame stack having an update scheme. Then, the vehicle can be determined to be stationary or moving. If the vehicle is determined to be stationary, the frame stack update scheme can be modified from a first in, first out (FIFO) scheme to a last in, first out (LIFO) scheme. Also, an optical flow tracks logic can be modified as described above. If, on the other hand, the vehicle is determined to be moving, the frame stack update scheme can be modified from a LIFO scheme to a FIFO scheme. Also, the optical flow tracks logic can be reverted in behavior as described above.

Another example method can begin with acquiring a sequence of image frames from a camera on a vehicle, and continue by estimating the camera pose and computing a translation vector relating the camera pose to a reference position. Then, the two threshold comparisons described above can be made, the vehicle can be determined to be moving or stationary based on the comparisons, and the behavior of a structure-from-motion (SfM) depth determination system can be modified based on the determination. Depths can be determined based on the sequence of image frames using the SfM depth determination system, and the vehicle can be controlled based on the determined depths.

The SfM depth determination system can include a frame stack update logic, and modifying the behavior of the SfM depth determination system can include modifying the frame stack update logic from a FIFO behavior to a LIFO behavior upon a determination that the vehicle is stationary, or vice versa upon a determination that the vehicle is moving.

The SfM depth determination system can also include an optical flow tracks logic to prune optical flow tracks generated from corresponding feature points in different frames. Modifying the behavior of the SfM depth determination system can include modifying the optical flow tracks logic from pruning based on the last-computed set of tracks to pruning based on the last set of tracks computed from a frame acquired while the vehicle was moving, upon a determination that the vehicle is stationary, or vice versa upon a determination that the vehicle is moving.

BRIEF DESCRIPTION OF THE DRAWINGS

FIGS. 4A and 4B respectively show representative point cloud output from the example SfM systems.

FIGS. 5A-5E illustrate the updating of a frame stack by an example frame stack logic.

FIGS. 6A-6G illustrate the updating of a frame stack by an example adaptive frame stack logic.

FIGS. 7A-7J illustrate how optical flow is updated by an example optical flow tracks logic.

FIGS. 8A-8J illustrate how optical flow is updated by an example adaptive optical flow tracks logic.

FIG. 11 is a flow chart showing an example method of performing a stationary check.

FIG. 12 is a flow chart showing an example method of updating a frame stack.

DETAILED DESCRIPTION

Systems and methods are described for determining three-dimensional (3D) structures from sequences of two-dimensional (2D) images acquired from a stationary vehicle. The systems and methods of the current disclosure can provide a dense 3D reconstruction of a scene, even when the vehicle is not moving (i.e., when an onboard camera is stationary). Such a capability is useful in an automotive scenario, as when an automobile is waiting at a traffic light or stop sign and accurate depth information indicative of a crossing pedestrian is needed to determine the location of the pedestrian and prevent the automobile from accelerating into the pedestrian. The systems and methods of the present disclosure can provide the depth information necessary to make such a determination, thus enhancing the navigational capabilities of the vehicle.

As the name "structure from motion" implies, SfM techniques generally are reliant on a moving camera to compute the desired 3D information regarding the surrounding scene from the 2D sequence of images generated by the camera. In the context of vehicular SfM systems, the camera can be mounted in a location in the vehicle, such as behind a windshield or other part of the vehicle. Once the vehicle starts moving, the SfM system is fed by a sequence of 2D images from the onboard camera representative of the captured scene, and can generate sensible 3D reconstructions.

Figure 1:
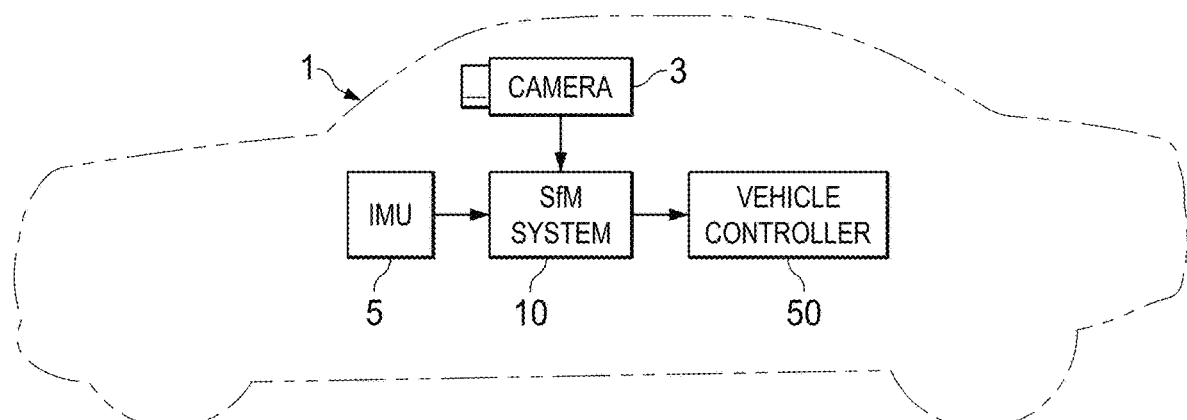
FIG. 1 shows an example structure from motion (SfM) system used for vehicular control.

In an example system like that shown in FIG. 1, camera 3 can be mounted to vehicle 1 to deliver image frames to SfM system 10. Vehicle 1 is illustrated as an automobile but can be any kind of vehicle, including watercraft, aircraft, or other types of land vehicles. Camera 3 can be mounted anywhere on the vehicle, including behind a windshield, or within the front, rear, or side body. SfM system 10 may also be fed information about the travel of vehicle 1 by inertial measurement unit (IMU) 5, which may comprise, for example, a 3D accelerometer and gyroscope and/or a speedometer.

SfM system 10 generates depth information about the surrounding scene, which may be, for example, in the form of 3D point clouds indicative of distances to obstacles, hazards, and/or targets. SfM system 10 delivers such information to vehicle controller 50, which uses the depth information to activate or deactivate vehicle control systems that can include propulsion systems, braking systems, steering or maneuvering systems, safety or restraint systems (e.g., seat belts, airbags, powered windows, and door locks), signaling systems (e.g., turn signals, blinker lights, horns, and sirens), and communication systems. Vehicle controller 50 may also be fed information from other sensor systems such as radar- or lidar-based detection systems and/or from manual piloting controls.

Figure 2A:
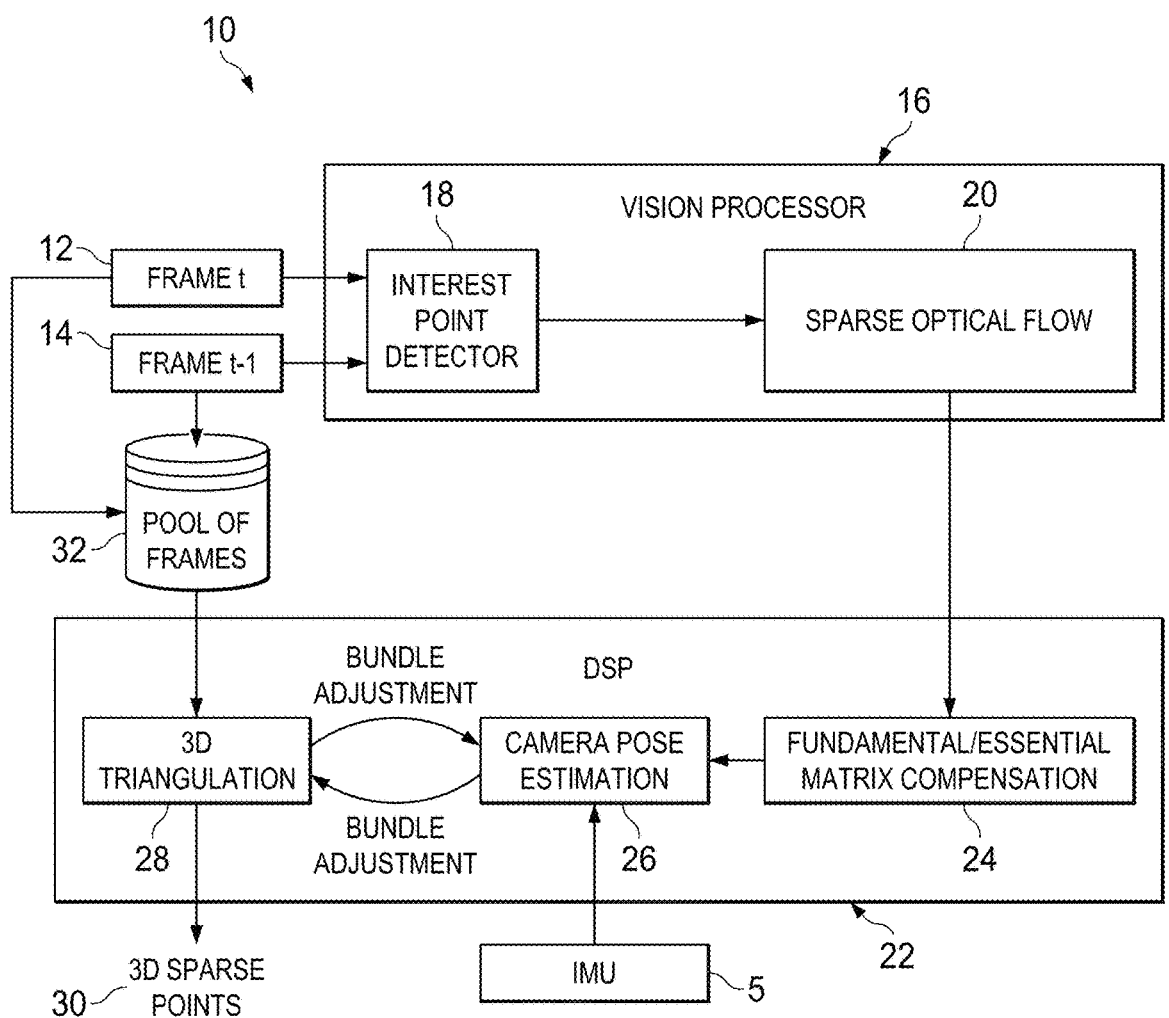
FIGS. 2A and 2B show example SfM systems.

FIG. 2A shows an example process flow for SfM system 10. A camera generates a sequence of 2D frames beginning with frame 1 and ending with newest frame t 12. Only two frames, t 12 and preceding sampled frame t−1 14, are illustrated in FIG. 1, but more than two frames may be processed. A subset of the frames is processed by the SfM system 10 to derive 3D information about the surrounding scene.

Vision processor 16 can detect interest points using interest point detector 18. Interest point detection may also be called feature point detection. Vision processor 16 can further perform sparse optical flow calculation 20. The vision processor 16 may be, for example, an Embedded Vision/Vector Engine (EVE), which is a specialized, fully-programmable processor with pipelines and units to accelerate computer vision algorithms, having a memory architecture better suited for sustained internal memory bandwidth for compute intensive algorithms than general-purpose processors. The vision processor 16 may also be a general-purpose processor, or the functions of the vision processor 16 may be performed instead by a digital signal processor (DSP), such as DSP 22.

Interest point detection 18 processes an individual image frame to find features, such as corners and/or edges that can yield points between different 2D images that consistently correspond to the same 3D point in space. Interest point detection 18 can use, for example, Shi-Tomashi or Harris methods to extract interest points, also called feature points. Given the detected feature points, sparse optical flow calculation 20 calculates interframe velocity vectors for some feature points, as at detected corners, for example. Optical flow calculation 20 can provide information describing how detected feature points have moved from one image frame to the next in the 2D image scene.

The several processes of fundamental/essential matrix computation 24, camera pose estimation 26, and 3D triangulation 28 can be performed by digital signal processor (DSP) 22. Fundamental/essential matrix computation 24 can be used to prune inaccurate optical flow tracks of feature points delivered by vision processor 16. Camera pose estimation can be computed based on the image data from frames 12 and 14, can be determined from an external sensor value, such as can be provided from inertial measurement unit (IMU) 5, or can be determined from some combination of these methods. 3D triangulation 28 provides 3D sparse points 30 representative of distances to objects in the surrounding scene, which can be output to other systems, such as vehicle controller 50 in FIG. 1 to control a vehicle to accelerate, brake, turn, swerve, etc to perform vehicle functions such as to approach targets, avoid obstacles and hazards, maintain or change lanes, etc.

Figure 3:
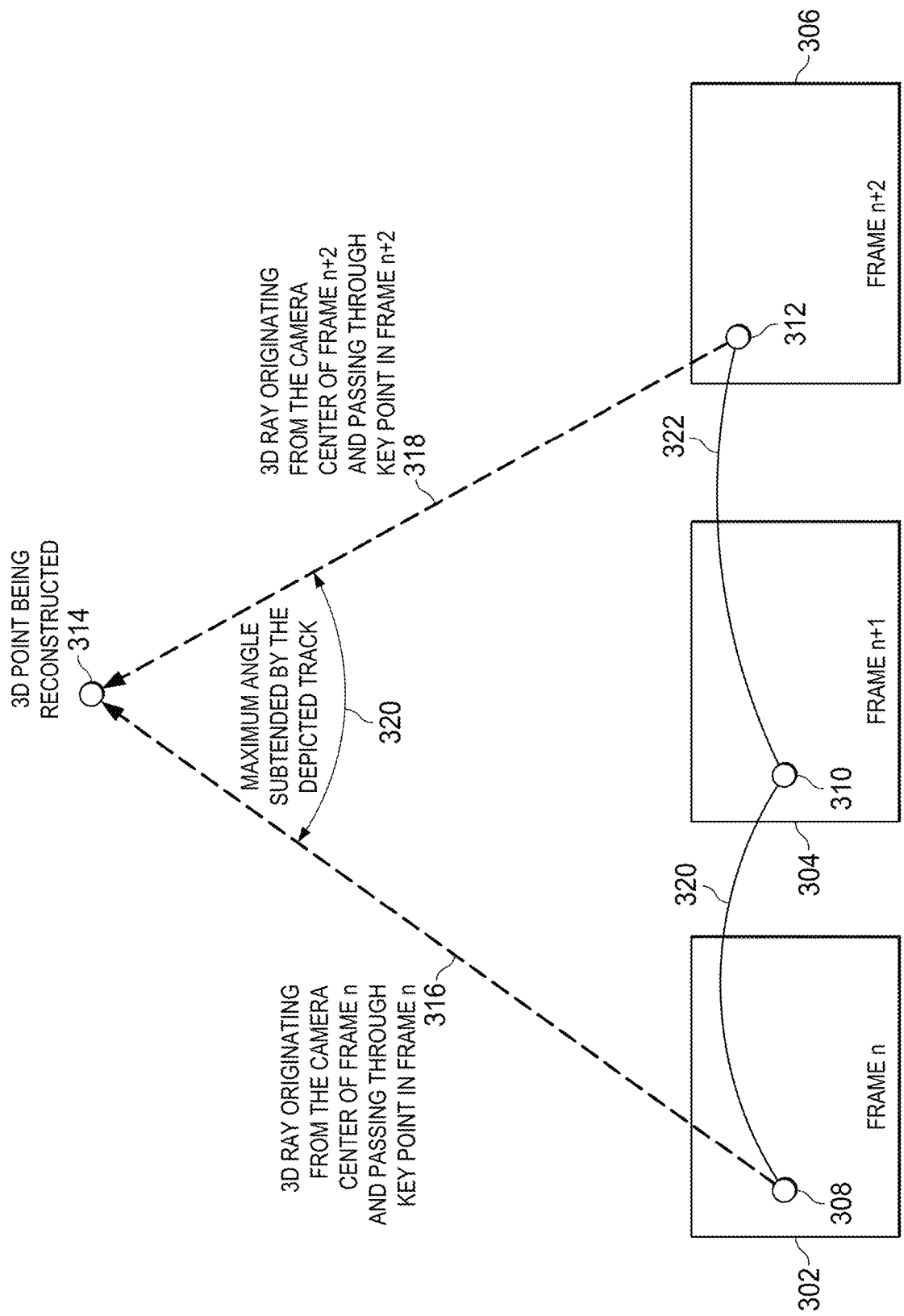
FIG. 3 is a diagram illustrating triangulation for SfM.

An example of triangulation is shown in FIG. 3. Three successive selected frames n 302, n+1 304, and n+2 306 contain respective key points 308, 310, and 312 that are identified as likely corresponding to the same point in 3D space, which is the 3D point 314 being reconstructed. The identification can be performed, for example, by a key point detection and optical flow methodology. Individual tracks 320, 322 define the motion of the key points 308, 310, and 312 from frame to frame. The position of the 3D point 314 in the 3D scene can be determined by computing the back-projected 3D ray 316 originating from the camera center of frame n 302 and passing through key point 308 in frame n 302, computing the back-projected 3D ray 318 originating from the camera center of frame n+2 306 and passing through key point 312 in frame n+2 306, and finding the intersection 314 of the two rays 316, 318.

Only a subset of captured frames need be used to compute 3D information, since the processing of each frame incurs a computational cost, and real-time processing is desirable, necessitating the fastest possible computation and thus the lowest computational cost. The subset of frames may consist only of a number of the most recent frames, since older frames are generally less informative about the current state of the scene. The frames from which the subset is drawn may be temporally sampled periodically from all frames acquired by the camera, but the temporal sample rate may be less than the native frame rate of the camera. Thus, for example, the camera may be capable of acquiring 100 frames per second, but in some examples it may be that only 30 frames per second are used for obtaining SfM. In other examples, it may be that only 10 frames per second are used. The exact frame rate used may depend upon the application and/or the speeds involved. For example, during freeway driving, when the vehicle is moving at fast speeds, 30 frames per second may be used for obtaining SfM, whereas during a slow-moving park-assist application, it may be that only 10 frames per second are used. The subset of frames to be processed to obtain SfM, e.g., upon which triangulation can be performed to arrive at a 3D point cloud, together make up the frame stack. Frames can be removed from the frame stack as new frames are added to the frame stack.

Thus, for example, while frames 1 through t−1 may initially be used to compute a 3D point cloud, when a new frame t is delivered, frame 1 may be discarded from the frame stack and thus from consideration in computing 3D information. As such, the new frame stack may consist of frames 2 to t−1 and frame t. A 3D point cloud can be generated using this new frame stack. This first in, first out (FIFO) flow of frames can continue as new frames are captured. Captured frames can be stored in a pool of frames 32 which can be made available to 3D triangulation 28. Pool of frames 32 can be stored, for example, in a non-transitory computer-readable memory. Computer-readable instructions for carrying out the different steps described can similarly be stored on the same or a different memory.

In an automotive scenario, a host vehicle may come to a halt, as at a traffic light or intersection, or in slow-moving traffic. The vehicle may later start moving again. At various points during such stop-go situations, the onboard camera ceases to be in motion, and the absence of camera motion can result in a loss of accurately computed depth information and a faulty SfM reconstruction.

When the camera is stationary, all the frames in the frame stack may all contain similar 2D information about the static scene, and there will not be a sufficient baseline for triangulation to compute a 3D point cloud. Such failure can be characterized by a paucity of reconstructed points, by points having depth values (i.e., estimated distances from the camera) that are inaccurate as compared to corresponding real scene depths, and/or by temporal instability in the set of feature points tracked.

The result of the failed reconstruction performed by SfM system 10 in the seconds immediately succeeding a vehicle stop is as shown in FIG. 4A. In the depicted stationary-camera video frame, overlain 3D points detected as nearer are illustrated with crosses 402 while points detected as further away are illustrated with X's 404. It can be observed in FIG. 4A that there are relatively few points and also they are wrongly reconstructed as all of them indicate low distance, even those points found on distant trees. Estimated distances in units of meters superimposed on the image of FIG. 4A also show, for example, that the back of a truck 406 two vehicles in front of the camera-equipped vehicle is detected as being nearer than the back of a car immediately in front of the camera-equipped vehicle. The more distant truck 406 is thought to be 3.2 meters away whereas the nearer car is thought to be 3.8 meters away. This illogical inaccuracy is apparent to a human observer and illustrates the failure of the SfM system 10 in FIG. 2A.

Figure 2B:
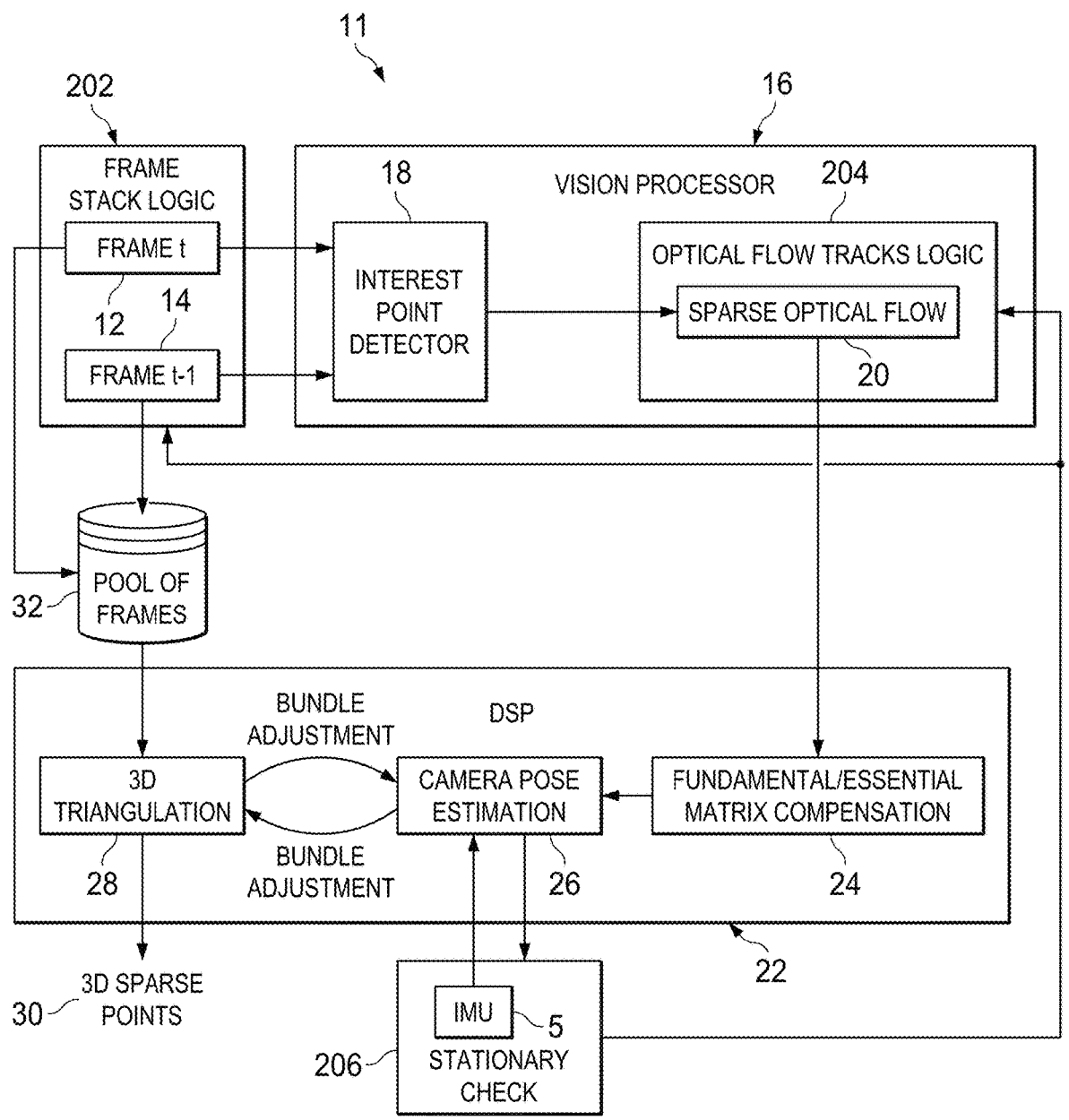

FIG. 2B illustrates SfM system 11 that alters the SfM system 10 of FIG. 2A any one or more of at least three ways. Frame stack logic 202 can intelligently, adaptively switch between various frame stack update methods depending on whether the camera and vehicle are in motion or not. Optical flow tracks logic 204 can alter how optical flow is updated and pruned. Stationary check 206 can alter how the SfM system 11 determines whether the camera is coming to a halt or not.

The stationary-camera scenario alteration of the frame stack logic 202 in SfM system 11 can provide sufficient baseline for triangulation to accurately compute the 3D point cloud 30 and also handle changes in the scene itself, such as objects moving out of the scene or entering the scene.

FIGS. 5A-5E illustrate the FIFO-updated frame stack update logic of SfM system 10. Frame numbers prefixed with the letter M represent frames captured while the vehicle is moving, while frame numbers prefixed with the letter S represent frames captured while the vehicle is stationary. In the illustrated examples of both FIGS. 5 and 6, the sequence of frames proceeds as M0, M1, M2, M3, M4, M5, M6, M7, S8, S9, S10, S11, S12, S13, S14, M15, M16, M17, and so on, indicative of a brief stop followed by a resumption of movement. The number of frames in the frame stack 502 can be determined by a sliding window. In the illustrated example, the sliding widow size used for triangulation is 6 frames.

Thus, in FIG. 5B, as compared to FIG. 5A, frame M0 504 is replaced by M6 506 after the first set of frames are processed, then, as shown in FIG. 5C, M1 508 is replaced by M7 510, and so on. When static frame S8 512 is captured and processed, as illustrated in FIG. 5D, M7 510 and S8 512 are used for matching and triangulation. However, because there is no motion between these M7 510 and S8 512, there is no sufficient baseline between these two frames, and triangulation will fail.

By contrast, SfM system 11 can handle the frame stock logic differently when the vehicle, and hence the camera, is not moving. Rather than using a FIFO frame stack logic, frame stack logic 202 can use a last in, first out (LIFO) flow of the frames. In general terms, instead of removing frame 1 when new frame t comes in, new frame t can replace frame t−1, such that the new frame stack would consist of frames 1, 2, . . . t−2, and t. This would ensure that there is sufficient baseline for triangulation to succeed. Also, since the point cloud data is recomputed for every new frame, it will be able to handle new information in scene, such as objects moving in-out of the scene. An example of the LIFO frame stack logic 202 of SfM system 11 is illustrated in the following table and in FIGS. 6A-6G.

| Frames in frame stack (sliding window state) | | | | | | Frame removed |
|---|---|---|---|---|---|---|
| M0 | M1 | M2 | M3 | M4 | M5 | |
| M1 | M2 | M3 | M4 | M5 | M6 | M0 |
| M2 | M3 | M4 | M5 | M6 | M7 | M1 |
| M2 | M3 | M4 | M5 | M6 | S8 | M7 |
| M2 | M3 | M4 | M5 | M6 | S9 | S8 |
| M2 | M3 | M4 | M5 | M6 | S10 | S9 |
| ... | | | | | | |
| M3 | M4 | M5 | M6 | S14 | M15 | M2 |
| M4 | M5 | M6 | S14 | M15 | M16 | M3 |
| M5 | M6 | S14 | M15 | M16 | M17 | M4 |
| M6 | S14 | M15 | M16 | M17 | ... | M5 |

FIGS. 6A-6C exhibit the same FIFO frame stack logic as in FIGS. 5A-5C. During this period the vehicle and camera are moving, so, for example, in FIG. 6A, frames M0 504 through M5 514 are considered for processing and the 3D point cloud 30 is generated by SfM system 11 using those six frames. When a new frame M6 506 is captured, the frame stack is updated in normal FIFO manner with M0 504 being replaced by M6 506. Frames M1 508 through M6 506 are considered for processing by SfM system 11, and the 3D points 30 are generated. This process is continued until a stationary frame S8 512 is encountered. When frame S8 512 is captured, instead of replacing M2 516 with S8 512 as in FIG. 5D, frame stack logic 202 replaces frame M7 510 with frame S8 512. Since frame S8 512 has no camera motion compared to M7 510, M7 510 is discarded. This ensures that SfM system 11 has sufficient baseline for triangulation to succeed by considering frames M2 516 through M6 506 and S8 512.

Similarly, when the next stationary frame S9 518 is captured, as shown in FIG. 6E, frame S8 512 is replaced with frame S9 518, and so on, in a LIFO manner. FIG. 6F depicts the replacement of frame S9 518 with last stationary frame S14 520 before the vehicle and camera begin moving again. When a moving frame M15 522 is encountered, as shown in FIG. 6G, the frame stack logic 202 resumes replacement of frames in frame stack 602 in a FIFO manner by replacing M2 516 with M15 522, and so on, as long as the vehicle remains in motion.

An example output of SfM system 11 using frame stack logic 202 is shown in the video frame of FIG. 4B. As can be observed by comparing FIG. 4B to the video frame of FIG. 4A, in which the frame stack was generated using only FIFO logic, even in the situation where the camera-equipped vehicle has stopped, sensible 3D reconstruction is obtained. As examples, the number feature points identified is greatly improved, background trees are correctly identified as distant, and the back of truck 406 is correctly estimated at a more distant 12 meters from the camera as compared to the back of the immediately leading car which is estimated at being 2.8 or 2.9 meters distant from the camera. It might also be observed from motion video of the output represented by FIG. 4B that the feature points exhibit temporal stability, with largely the same feature points being represented from frame to frame even while the vehicle is stationary.

SfM system 11 can also include optical flow tracks logic 204, which can use a modification of a pyramidal Lucas-Kanade implementation of optical flow to find feature matches between two frames, such as between frame n 302 and frame n+2 306 shown in FIG. 3. The Lucas-Kanade method is a differential method for optical flow estimation that assumes that the flow is essentially constant in a local neighborhood of each pixel under consideration, and solves the basic optical flow equations for all the pixels in that neighborhood, by the least squares criterion.

Although tracks can be generated between any two frames, and the frames whose feature points are compared need not be consecutive in the temporal sequence of acquired frames, in order to reduce the number of combinations of frames to match, it may be that only consecutive frames in the frame stack are considered for matching. Thus, for example, in the frames shown in FIG. 3, feature points in frame n 302 can be matched with corresponding feature points in frame n+1 304 to arrive at optical flow tracks, and feature points in frame frame n+1 304 can be matched with corresponding feature points in frame n+2 306 to arrive at optical flow tracks. Tracks that do not find a match in the last frame can be removed and not considered for future frames. This can be done in order to retain only the most reliable tracks in a given frame for triangulation.

The disclosed improvement in the method of feature track generation in SfM system 11 is illustrated via the contrast between, on the one hand, FIGS. 7A-7J, which together make up one sequence, and, on the other hand, FIGS. 8A-8J, which together make up a similar sequence that uses the improved optical flow tracks logic 204. Both of the illustrated examples take into account the adaptive frame stack logic 202. In the illustrated examples, frames acquired while the vehicle and camera are moving are prefixed with the letter M, while frames acquired while the vehicle and camera are stationary are prefixed with the letter S. In the illustrated examples, the sliding window size used for triangulation is 6, and the sequence of frames is M0, M1, M2, M3, M4, M5, M6, M7, S8, S9, M10, and so on.

Thus, as shown in FIG. 7A, optical flow tracks $T_R1$ 702 can be computed between feature points in first two frames M0 504 and M1 508. Then, when new frame M2 516 comes in, optical flow tracks can be computed between feature points in frames M2 516 and M1 508, as shown in FIG. 7B. These computed tracks are merged with the previously computed tracks $T_R1$ 702 to arrive at tracks $T_R2$ 704. This merging can be done to preserve the "history" of the tracks computation. For example, there might be recognized feature points that are present in all three frames M0 504, M1 508, M2 516, and since the latest step of optical flow track generation was done by performing matching of these points in M2 516 with respect to M1 508 only, the merging of tracks $T_R1$ 702 will incorporate the prior computed information if the feature point match found in M1 508 also has a match in M0 504. In this way, $T_R2$ 704 is "pruned" based upon the feature point matches found between frames M2 516 and M1 508 as well as $T_R1$ 702, which itself consists of feature point matches between frames M1 508.

Similarly, as shown in FIG. 7C, when new frame M3 524 is acquired, optical flow tracks can be computed between feature points in frames M3 524 and M2 516, and these tracks can be pruned by looking at tracks $T_R2$ 704 to arrive at tracks $T_R3$ 706. This sequential method of updating tracks can be real-time and can be performed on embedded systems of limited computational power because the method involves feature point matching between only two frames and the number of tracks is limited to a reasonable number that can be handled in an embedded system.

The method continues in the same manner in FIGS. 7D, 7E, 7F, and 7G. As shown in FIG. 7E, frames M0 504 through M5 514 are considered for track formation and all the tracks that find a match in M5 514 are retained and considered for 3D point cloud generation. When the new frame M6 506 is captured, as shown in FIG. 7F, frame M0 504 is replaced by frame M6 506 in the frame stack, since, in the illustrated example, the sliding window size is 6. Lucas-Kanade optical flow can be done only for frame pair M5 514 and M6 506 and the tracks that find a match in M6 506 can be retained for further processing.

FIG. 7H illustrates the condition when a static frame, S8 518, is acquired. As described previously with regard to adaptive frame stack logic 202, the frame stack can be updated in a LIFO manner when the camera is stationary. Thus, frame M7 510 can be removed from the stack, instead of removing frame M2 516 from the stack. The feature point matching can then be performed between frames M6 506 and S8 512.

Because $T_R7$ 714 pertains to matches found between M7 510 and M6 506, and because the adaptive frame stack logic 202 operates as though M7 510 does not exist, it would be wrong to prune tracks found between S8 512 and M6 506 using tracks $T_R7$ 714 to arrive at tracks $T_R8$ 716. Doing so would, for example, fail to account for the history of tracks where matching feature points are found in M6 506 and S8 512 but missing from M7 510. As such, the above-described method of track formation, as illustrated in FIGS. 7A-7J, can produce undesirable results during a stop-go camera motion scenario.

When frame S8 is 512 captured, as shown in FIG. 7H, frame M7 510 is replaced by frame S8 512. However, tracks $T_R7$ 714 would be pruned such that tracks that had a match in frame M7 510 were retained. Using these tracks for finding a match with S8 512, as indicated in FIG. 7H, would yield an incorrect result, because tracks pertaining to M6 506 need to be considered to find match in S8 512. One way to do so may be to perform Lucas-Kanade optical flow matching for all six frames M2 516 through M6 506 and S8 512 again, but doing so would increase computational complexity significantly whenever a stationary situation would occur.

Instead, a back-up/restore mechanism of tracks can be used. A back-up of the un-pruned tracks and pruned tracks can be taken. When the current frame is not stationary, the pruned tracks are restored and updated based on the match found in the current frame. However, when a stationary frame is encountered, the un-pruned tracks are restored and updated based on the match found on the current frame. Only the pruned tracks are used for computing the 3D point cloud for any given set of frames.

This approach is explained with reference to FIGS. 8A-8J and the below table. The process in FIGS. 8A-8G appears identical to that of FIGS. 7A-7G. As shown in FIG. 8F and in the second line of the table, tracks $T_R5$ 710 are used for pruning when new frame M6 506 is processed. Similarly, tracks $T_R6$ 712 are used when frame M7 510 is processed, as shown in FIG. 8G and in the third line of the table.

However, during stationary frames, instead of using pruned tracks, the method can use the tracks that are not pruned. This can be done by a backup-restore mechanism, taking a back up of both pruned and unpruned tracks after the optical flow of each frame, then restoring the appropriate tracks based on a stationary check. Thus, for example, when stationary frame S8 512 is processed, tracks $T_R6$ 712 are used and not tracks $T_R7$ 714, as shown in FIG. 8H and in the fourth line of the table. Similarly, when frame S9 518 is processed, as illustrated in FIG. 8I, tracks $T_R6$ 712 are used to update the match and not tracks $T_R8$ 716.

When a moving frame is again encountered, such as frame M10 722 in FIG. 8J, then tracks $T_R9$ 718 can be used for pruning, and not tracks $T_R6$ 712. For the purposes of illustration, the example in the below table has more stationary frames than illustrated in FIGS. 8A-8J. In the below table, the camera remains stationary through frame S14. When moving frame M15 is encountered, tracks $T_R14$ can be used, and not tracks $T_R6$.

To summarize the below table, when moving frames M6 and M7 are encountered, then "tracks after pruning" $T_R5$ and $T_R6$ can be respectively restored and used for further processing. When stationary frames S8 through S14 are encountered, "tracks before pruning" $T_R6$ can be restored and used for further processing. When moving frames M15 and M16 are encountered again, "tracks after pruning" $T_R14$ and $T_R15$ respectively can be used for further processing.

| Sliding window state | | | | | | Tracks before pruning | Tracks after pruning |
|---|---|---|---|---|---|---|---|
| M0 | M1 | M2 | M3 | M4 | M5 | $T_R4$ | $T_R5$ |
| M1 | M2 | M3 | M4 | M5 | M6 | $T_R5$ | $T_R6$ |
| M2 | M3 | M4 | M5 | M6 | M7 | $T_R6$ | $T_R7$ |
| M2 | M3 | M4 | M5 | M6 | S8 | $T_R6$ | $T_R8$ |
| M2 | M3 | M4 | M5 | M6 | S9 | $T_R6$ | $T_R9$ |
| M2 | M3 | M4 | M5 | M6 | S10 | $T_R6$ | $T_R10$ |
| ... | | | | | | | |
| M3 | M4 | M5 | M6 | S14 | M15 | $T_R14$ | $T_R15$ |
| M4 | M5 | M6 | S14 | M15 | M16 | $T_R15$ | $T_R16$ |
| M5 | M6 | S14 | M15 | M16 | M17 | $T_R16$ | $T_R17$ |
| M6 | S14 | M15 | M16 | M17 | ... | $T_R17$ | ... |

Aside from the possible additions of frame stack logic 202 and optical flow tracks logic 204, which together make up stationary vehicle flow based processing, SfM system 11 can also include stationary check 206 that can alter how the SfM system 11 determines whether the camera is coming to a halt or not. The following process can be used in stationary check 206 to make a determination that a vehicle is stationary.

In an automotive scenario, typically, a vehicle and its associated camera comes to a halt gradually over time rather than abruptly. Consequently, a system that would wait for the vehicle and camera to come to a stand-still position to take any action would do so too late to recover an accurate 3D point cloud since most of the points would not have sufficient baseline and hence would not be properly reconstructed. A threshold-based approach can be employed in order to determine if the vehicle and camera are stationary and the stationary vehicle flow based processing can be enabled accordingly. Such processing can include the frame stack logic 202 and/or the optical flow tracks logic 204 as described above.

The SfM 3D-point recovery process can rely on camera pose information, such as may be derived by camera pose estimation 12 in FIG. 2B. As shown, the pose information can be computed from information provided by external sensors, such as inertial measurement unit (IMU) 5, from information in acquired images using, for example, a fundamental matrix decomposition based technique or a perspective-n-point (PnP) technique, or by some combination of these. The pose information contains information describing the translation and rotation of the camera with respect to a reference frame.

The translation information present in the pose matrix can be used to determine if the camera is moving or not. A camera can be "considered" to be stationary even if it is not completely stationary; a camera that is moving too slowly to recover accurate depth information from acquired frames using conventional SfM techniques can be considered to be stationary. The camera is considered to be stationary if either of the below two conditions is true, or if both of them are true. First, if the magnitude of the difference between the translation vectors of captured image frames that are consecutive in time (i.e., $Abs(T_X - T_{X-1})$) is less than a threshold $Th_1$, the camera may be said to be stationary. Second, if magnitude of the difference between the translation vector $T_X$ of the current frame and the last moving frame in the frame stack (i.e., $Abs(T_X - T_{last-moving})$) is less than a threshold $Th_2$, the camera may be said to be stationary.

If either of the above conditions is true, then the stationary vehicle flow is enabled. That is to say, the frame stack logic 202 can switch from FIFO to LIFO, as described above, and the optical flow tracks logic 204 can similarly adapt how its tracks are pruned, as described above. The thresholds Th1 and Th2 can be made configurable. Th1 may be chosen, for example, to be between 0.02 meters to 0.05 meters. Th2 may be chosen, for example, as K×Th1, where K is the sliding window size. If, however, both conditions are false, then the vehicle may be said to be in motion and the SfM system 11 may operate the same as SfM system 10.

The use of the dual thresholds as described can prevent the failure that may occur when a number of small translations over a series of frames accumulatively result in sufficiently large (i.e., superthreshold) camera translation even though the interframe translation between pairs of frames considered individually may be too small to be detected as motion by a single threshold. Under the described failure condition, the optical tracker of the SfM system may stop working reliably because over a period of time the accumulated motion may be too large to find reliable tracks.

The below table provides examples of several conditions illustrating the functioning of stationary check 206. The examples have a sliding window size of 2 frames. In a first example, the magnitude of the difference between the camera translation vectors of the first two frames is greater than a first threshold $Th_1$ and is also greater than a second threshold $Th_2$. Thus, the camera is considered to be moving, which determination may be communicated to frame stack logic 202 and optical flow tracks logic 204, as illustrated in FIG. 2B.

In a second example, the magnitude of the difference between a frame 3 camera translation vector $T_3$ and a frame 2 camera translation vector $T_2$ is less than the first threshold $Th_1$, and the magnitude of the difference between the frame 3 camera translation vector $T_3$ and the camera translation vector of the last moving frame, which in this case happens to be $T_2$ from frame 2, is less than the second threshold $Th_2$. Thus, because at least one of the threshold conditions is met—in this case, they both happen to be met—the camera is considered to be stationary, which determination may be communicated to frame stack logic 202 and optical flow tracks logic 204, as illustrated in FIG. 2B. The third example is similar to the second.

In a fourth example, the magnitude of the difference between a frame 5 camera translation vector $T_5$ and a frame 4 camera translation vector $T_4$ is greater than the first threshold $Th_1$, but the magnitude of the difference between the frame 5 camera translation vector $T_5$ and the camera translation vector of the last moving frame, which again happens to be $T_2$ from frame 2, is less than the second threshold $Th_2$. Thus, because at least one of the threshold conditions is met—in this case, only the second threshold condition is met—the camera is considered to be stationary, which determination may be communicated to frame stack logic 202 and optical flow tracks logic 204, as illustrated in FIG. 2B.

The fifth and sixth examples are similar to the first example in that neither threshold condition is met, and the vehicle and camera are determined to be moving. In the sixth example, however, the second threshold condition tests the difference in magnitude between frame 7's translation vector $T_7$ and frame 6's translation vector $T_6$, since frame 6 is now considered to be the last moving frame, rather than frame 2.

| Sliding window size for triangulation = 2 | | Threshold Condition 1 < $Th_1$ | Threshold condition 2 < $Th_2$ | Result |
| --- | --- | --- | --- | --- |
| Frame 1 | Frame 2 | $Abs(T_2 - T_1) < Th_1$ = FALSE | $Abs(T_2 - T_1) < Th_2$ = FALSE | Not stationary |
| Frame 2 | Frame 3 | $Abs(T_3 - T_2) < Th_1$ = TRUE | $Abs(T_3 - T_2) < Th_2$ = TRUE | Stationary |
| Frame 2 | Frame 4 | $Abs(T_4 - T_3) < Th_1$ = TRUE | $Abs(T_4 - T_2) < Th_2$ = TRUE | Stationary |
| Frame 2 | Frame 5 | $Abs(T_5 - T_4) < Th_1$ = FALSE | $Abs(T_5 - T_2) < Th_2$ = TRUE | Stationary |
| Frame 2 | Frame 6 | $Abs(T_6 - T_5) < Th_1$ = FALSE | $Abs(T_6 - T_2) < Th_2$ = FALSE | Not stationary |
| Frame 6 | Frame 7 | $Abs(T_7 - T_6) < Th_1$ = FALSE | $Abs(T_7 - T_6) < Th_2$ = FALSE | Not stationary |

The present disclosure thus provides three examples that can work in conjunction. First, an adaptive frame stack update logic 202 can convert from FIFO to LIFO when a stationary frame is encountered such that there is sufficient baseline for triangulation between the stationary frame and the reference frame. Second, an optical flow tracks logic 204 can perform matches with respect to a reference frame, even when the stationary camera based frame stack update logic is enabled. Third, a stationary check 206 can determine whether a vehicle and camera are stationary or moving using two alternative threshold conditions based on the translation vector obtained from the pose matrix, and this determination can be used to activate the stationary-camera modes of either or both of the adaptive frame stack update logic 202 and/or the optical flow tracks logic 204.

FIGS. 9-14 illustrate methods that can correspond to the above-described examples.

Figures 9, 10:
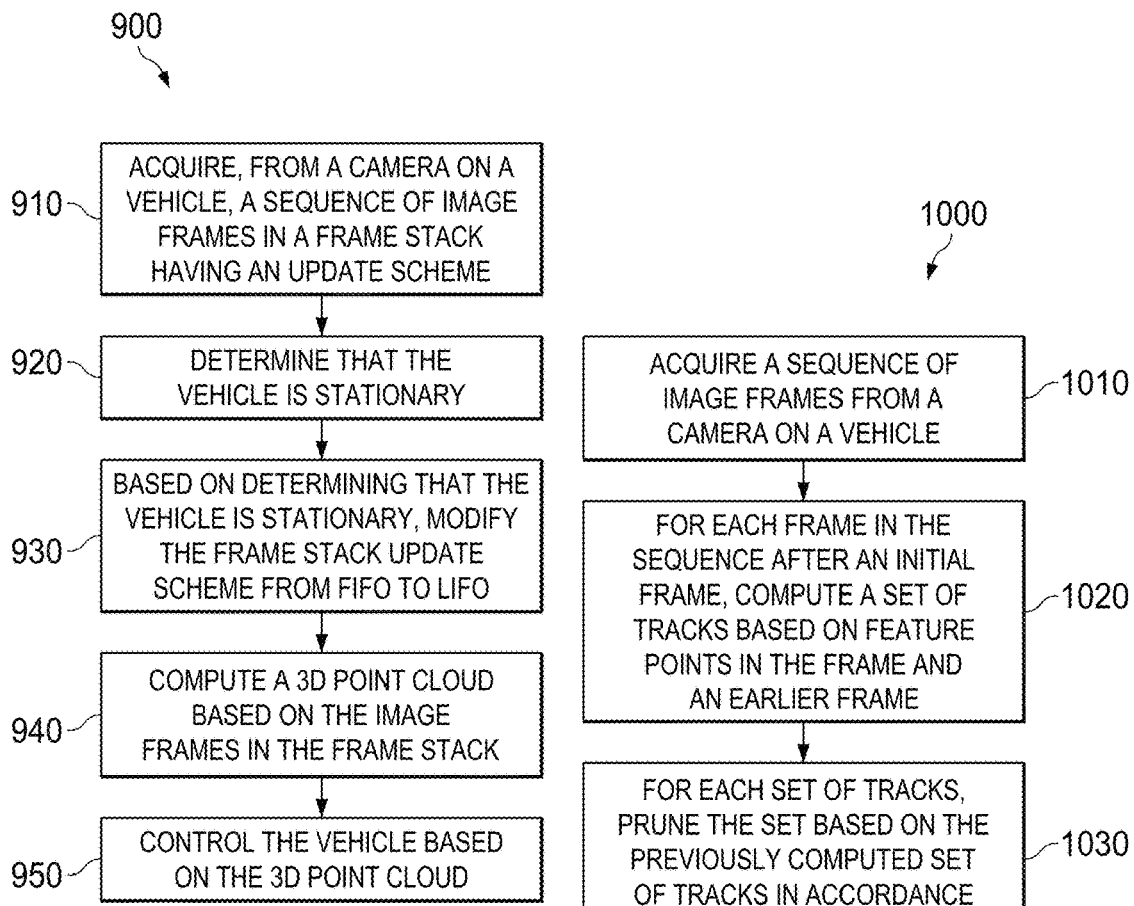
FIG. 9 is a flow chart showing an example method of updating a frame stack.
FIG. 10 is a flow chart showing an example method of updating flow tracks.

FIG. 9 is a flow chart illustrating a method 900 of controlling a vehicle using an SfM system having an adaptive frame stack update logic, such as frame stack update logic 202 shown in FIG. 2B. First, the system can acquire 910, from a camera on a vehicle, a sequence of image frames in a frame stack having an update scheme. The camera can correspond to camera 3 in FIG. 1, and the vehicle can correspond to vehicle 1 in FIG. 1. Second, the system can determine 920 that the vehicle and camera are stationary. This determination can be made, for example, using the stationary check 206, and can be informed by one or both of an IMU and/or through vision-based methods such as camera pose estimation.

Third, based on determining 920 that the vehicle and camera are stationary, the system can modify 930 the frame stack update scheme from FIFO to LIFO, as shown and described above with reference to FIGS. 6D-6F. Fourth, the system can compute 940 a 3D point cloud based on the image frames in the frame stack. Fifth, the system can control 950 the vehicle based on the 3D point cloud. This control 950 can be done, for example, by vehicle controller 50 in FIG. 1. Simple examples of such control might be applying the brakes or inhibiting acceleration when the point cloud indicates that there is an object or another vehicle within a threshold distance or looming at a threshold speed.

FIG. 10 is a flow chart illustrating a method 1000 of controlling a vehicle using an SfM system having an optical flow tracks logic, such as optical flow tracks logic 204 shown in FIG. 2B. First, the system can acquire 1010 a sequence of image frames from a camera on a vehicle. The camera can correspond to camera 3 in FIG. 1, and the vehicle can correspond to vehicle 1 in FIG. 1. For each frame in the sequence after an initial frame, the system can compute 1020 a set of tracks based on feature points in the frame and an earlier frame. For each set of tracks, the system can prune 1030 the set based on the previously computed set of tracks in accordance with a pruning scheme.

The system can determine 1040 that the vehicle and camera are stationary. This determination can be made, for example, using the stationary check 206, and can be informed by one or both of an IMU and/or through vision-based methods such as camera pose estimation. Based on determining 1040 that the vehicle and camera are stationary, the system can modify 1050 the pruning scheme from pruning based on the previously computed set of tracks to pruning based on the last set of tracks computed from a frame acquired while the vehicle was moving, as described above with reference to FIGS. 8H and 8I. The system can then compute 1060 a 3D point cloud based on the sets of tracks and can control 1070 the vehicle based on the 3D point cloud. The computation 1060 and control 1070 can be similar to the computation 940 and control 950 described above with reference to FIG. 9.

FIG. 11 is a flow chart illustrating a method 1100 of controlling a vehicle using an SfM system having a stationary check, such as stationary check 206 shown in FIG. 2B. First, the system can acquire 1110 a sequence of image frames from a camera on a vehicle. The camera can correspond to camera 3 in FIG. 1, and the vehicle can correspond to vehicle 1 in FIG. 1. For each acquired frame, the system can estimate the camera pose and compute 1120 a translation vector relating the camera pose to a reference position in the sequence after an initial frame.

Then, the system can make two different comparisons 1130, 1140, which comparisons can be done in either order or in parallel. The system can compare 1130 the magnitude of the difference between the translation vectors corresponding to captured image frames that are consecutive in time with a first threshold. The first threshold can be chosen, for example, to be between 0.02 meters to 0.05 meters. The system can also compare 1140 the magnitude of the difference between the translation vector corresponding to the most recently acquired frame and the translation vector corresponding to the last frame acquired while the camera was moving with a second threshold. The second threshold can be chosen, for example, as the product of the first threshold and a sliding window size indicative of the number of frames in a frame stack used to make the structure from motion computation later at 1160.

Based on both of the comparisons, the system can determine 1150 that the vehicle and camera are stationary and modify the behavior of a structure-from-motion depth determination system. For example, the system can modify the behavior of a frame stack logic, such as frame stack logic 202 described above with respect to FIG. 2B. For example, the system can alter the frame stack logic from FIFO to LIFO, as described with reference to FIGS. 6D-6F. The system may additionally alter an optical flow tracks logic, such as optical flow tracks logic 204 in FIG. 2B, in the manner described above with regard to FIGS. 8H-8I.

More specifically, as described previously, the system can make the determination that the vehicle and camera are stationary if either or both of the following are true: (1) the magnitude of the difference between the translation vectors corresponding to captured image frames that are consecutive in time is less than the first threshold, and (2) the magnitude of the difference between the translation vector corresponding to the most recently acquired frame and the translation vector corresponding to the last frame acquired while the camera was moving is less than the second threshold.

The system can then determine 1160 depths based on the sequence of image frames. The depths might be determined, for example, by using SfM to compute a 3D point cloud from the acquired image frames, which point cloud is indicative of depths, i.e., distances between the camera (and hence, the vehicle) and other objects. The system can then control 1170 the vehicle based on the determined depths, in the ways discussed previously, for example.

FIG. 12 is a flow chart illustrating a method 1200 of controlling a vehicle using an SfM system having a adaptive frame stack update logic, such as frame stack update logic 202 shown in FIG. 2B. The acquiring 1210, determining 1220, and modifying 1230 can be identical to the acquiring 910, determining 920, and modifying 930 in FIG. 9. However, the method 1200 can also determine 1240 that the vehicle and camera are moving again after having stopped. Based on this determination, the system can modify 1250 the frame stack update scheme from LIFO to FIFO, as shown and described above with reference to FIG. 6G. Then, the system can compute 1260 a 3D point cloud based on the image frames in the frame stack and can control 1270 the vehicle based on the 3D point cloud, similar to the computation 940 and control 950 in FIG. 9.

Figure 13:
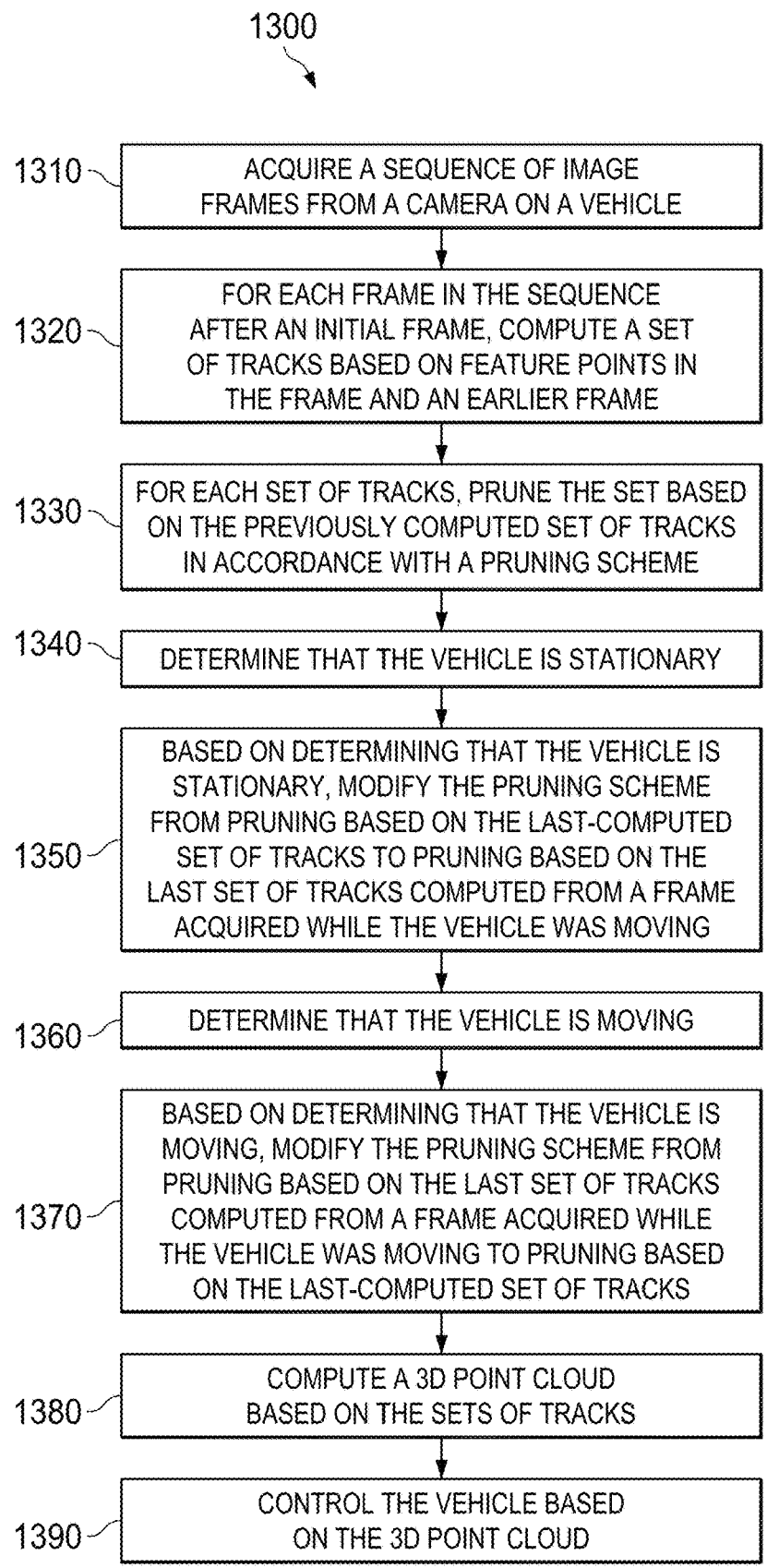
FIG. 13 is a flow chart showing an example method of updating flow tracks.

FIG. 13 is a flow chart illustrating a method 1300 of controlling a vehicle using an SfM system having a optical flow tracks logic, such as optical flow tracks logic 204 shown in FIG. 2B. The acquiring 1310, computing 1320, pruning 1330, determining 1340, and modifying 1350 can be identical to the acquiring 1010, computing 1020, pruning 1030, determining 1040, and modifying 1040 in FIG. 10. However, the method 1300 can also determine 1360 that the vehicle and camera are moving again after having stopped. Based on determining 1360 that the vehicle and camera are moving, the system can modify 1370 the pruning scheme from pruning based on the last set of tracks computed from a frame acquired while the vehicle was moving to pruning based on the previously computed set of tracks, as described above with reference to FIG. 8J. The system can then compute 1380 a 3D point cloud based on the sets of tracks and can control 1390 the vehicle based on the 3D point cloud, similar to the computing 1060 and controlling 1070 in FIG. 10.

Figure 14:
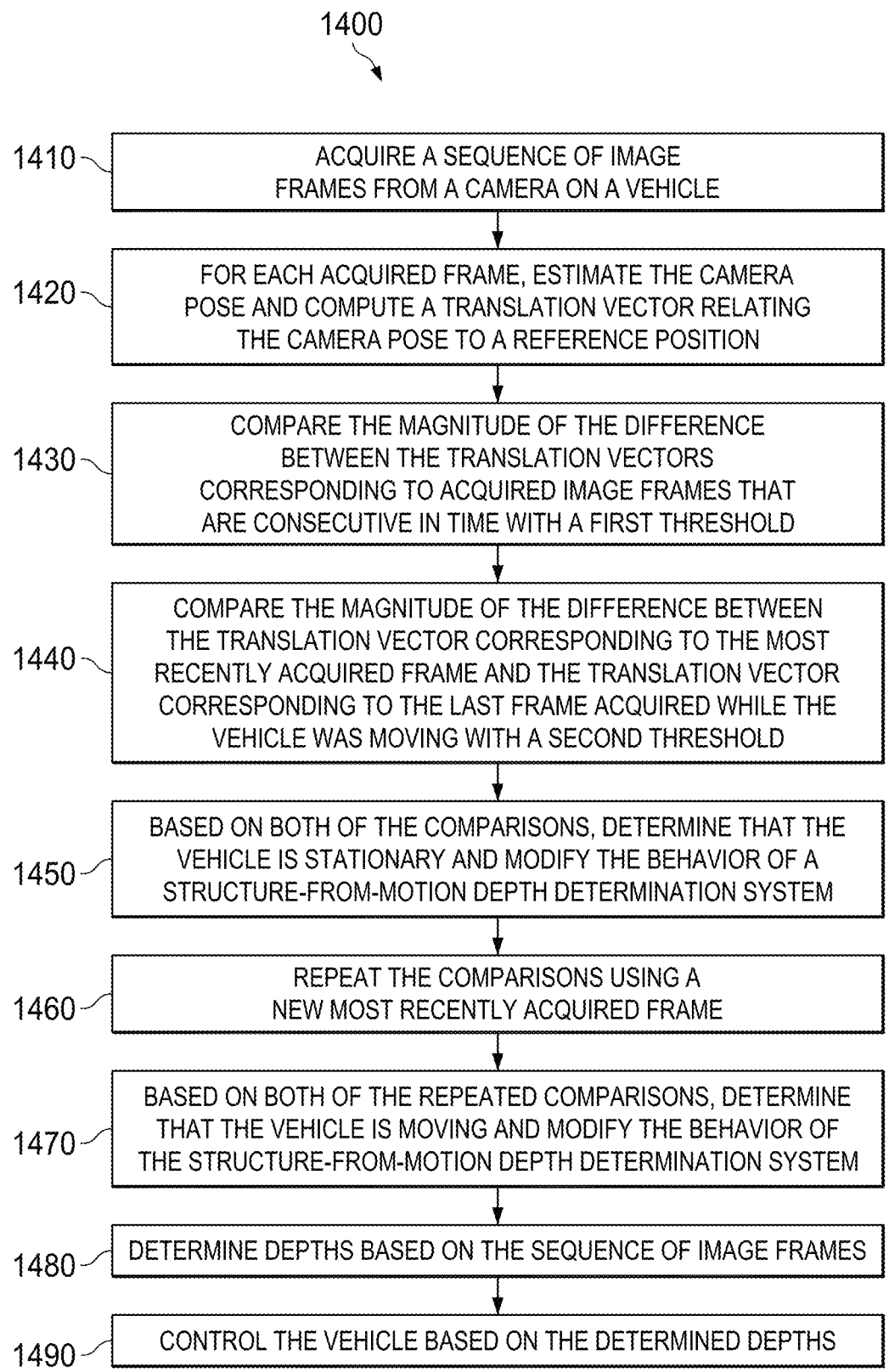
FIG. 14 is a flow chart showing an example method of performing a stationary check.

FIG. 14 is a flow chart illustrating a method 1400 of controlling a vehicle using an SfM system having a stationary check, such as stationary check 206 shown in FIG. 2B. The acquiring 1410, estimating and computing 1420, comparing 1430 and 1440, and determining and modifying 1450 can be identical to the acquiring 1110, estimating and computing 1120, comparing 1130 and 1140, and determining and modifying 1150 in FIG. 11. However, the method 1400 can also repeat 1460 the comparisons 1430 and 1440 using a new most recently acquired frame. That is, some time after the comparisons 1430, 1440 are made, after at least one new frame has been acquired, the system can, in either order or in parallel, compare the magnitude of the difference between the translation vectors corresponding to captured image frames that are consecutive in time with a first threshold, and compare the magnitude of the difference between the translation vector corresponding to the new most recently acquired frame and the translation vector corresponding to the last frame acquired while the camera was moving with a second threshold. The thresholds can be as discussed previously.

Based on both of the repeated comparisons, the system can determine 1470 that the vehicle and camera are moving and modify the behavior of a structure-from-motion depth determination system. For example, the system can modify the behavior of a frame stack logic, such as frame stack logic 202 described above with respect to FIG. 2B. For example, the system can alter the frame stack logic from LIFO to FIFO, as described with reference to FIG. 6G. The system may additionally alter an optical flow tracks logic, such as optical flow tracks logic 204 in FIG. 2B, in the manner described above with regard to FIG. 8J.

More specifically, as described previously, the system can make the determination that the vehicle and camera are moving when (and only when) both of the following are true: (1) the magnitude of the difference between the translation vectors corresponding to captured image frames that are consecutive in time is equal to or greater than the first threshold, and (2) the magnitude of the difference between the translation vector corresponding to the most recently acquired frame and the translation vector corresponding to the last frame acquired while the camera was moving is equal to or greater than the second threshold.

The system can then determine 1480 depths based on the sequence of image frames, as in 1160 in FIG. 11. The system can then control 1490 the vehicle based on the determined depths, as in 1170 in FIG. 11.

The present systems and methods provide robust SfM that continues to provide accurate depth information even when the vehicle and camera come to a halt. The systems and methods of the present disclosure can enable the usage of monocular cameras even when the vehicle and camera stop, thereby making the monocular camera-based solution more viable due to its robustness and cost-effectiveness. The present systems and methods can handle changes in a scene such as objects moving into or out of the scene. The present systems and methods are also computationally efficient, in that, for example, no additional segmentations are needed, or, as another example, the back-up/restore mechanism of optical flow tracks logic 204 does not require repeating optical flow matching for all frames in the frame stack. Furthermore, the described camera pose and thresholding approach to determine when the stationary camera flow has to be enabled or disabled may yield more accurate results than approaches that use only a single threshold condition, for the reason discussed previously.

While this disclosure has discussed its methods and systems in terms of monocular examples (i.e., involving a single camera), a structure-from-motion system can use multiple cameras and/or multiple processing systems to derive depth information about the surrounding scene. For example, multiple outward-facing cameras may be placed about the perimeter of a vehicle so as to acquire 2D information about the surrounding scene from multiple directions. Such information can then be processed by an SfM system, or multiple SfM systems running in parallel, and the resultant 3D data can be merged into a single representation or understanding of the surrounding scene. In some examples, multiple cameras may be placed such that front peripheral vision is provided. In other examples, complete 360-degree view of the surrounding environment can be captured and processed, thereby eliminating "blind spots" in the system.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An automotive system comprising:
   a processor; and
   a non-transitory computer readable storage medium storing instructions that, when executed by the processor, cause the processor to:
   receive a sequence of image frames from a camera;
   determine whether a vehicle associated with the sequence of image frames is stationary;
   in response to determining that the vehicle is stationary, change an order for storing the sequence of image frames in a frame stack from a first technique to a second technique that is different from the first technique; and
   store a first image frame of the sequence of image frames in the frame stack according to the second technique.

2. The automotive system of claim 1, wherein the instructions include further instructions that cause the processor to:

in response to determining that the vehicle is in motion, change the order for storing the sequence of image frames in the frame stack from the second technique to the first technique; and store a second image frame of the sequence of image frames in the frame stack according to the first technique.

3. The automotive system of claim 1, wherein the instructions include further instructions that cause the processor to:
compute depth values based on the sequence of image frames as stored in the frame stack; and
control an operation of the vehicle according to the depth values.

4. The automotive system of claim 1, wherein the first technique is a first in, first out technique and the second technique is a last in, first out technique.

5. The automotive system of claim 1, wherein the instructions that cause the processor to determine whether the vehicle is stationary include instructions to:
estimate a pose of the camera;
use the sequence of image frames to compute a set of translation vectors relating the pose of the camera to a reference position;
determine a first difference between a subset of the set of translations vectors corresponding to consecutive frames of the sequence of image frames; and
determine whether the vehicle is stationary based on the first difference.

6. The automotive system of claim 5, wherein the instructions that cause the processor to determine whether the vehicle is stationary include further instructions to:
determine a second difference between a first vector of the set of translation vectors corresponding to a most recently acquired frame of the sequence of image frames and a second vector of the set of translation vectors corresponding to a most recent frame of the sequence of image frames that was acquired while the vehicle was in motion; and
determine whether the vehicle is stationary further based on the second difference.

7. The automotive system of claim 6, wherein the instructions that cause the processor to determine whether the vehicle is stationary include further instructions to:
compare the first difference to a first threshold;
compare the second difference to a second threshold; and
determine whether the vehicle is stationary further based on the comparison of the first difference to the first threshold and the comparison of the second different to the second threshold.

8. The automotive system of claim 7, wherein the second threshold is based on the first threshold and a sliding window size equal to a number of frames in the frame stack.

9. The automotive system of claim 1, wherein the instructions include further instructions that cause the processor to:
prune optical flow tracks generated from corresponding feature points in different frames of the sequence of image frames; and
in response to determining that the vehicle is stationary, change from pruning based on a last computed set of tracks to pruning based on a most recent set of tracks computed from a frame acquired while the vehicle was moving.

10. The automotive system of claim 1, wherein the instructions include further instructions that cause the processor to:
receive, from an inertial measurement unit, a set of inertial measurement data; and determine whether the vehicle is stationary further based on the set of inertial measurement data.

11. A method comprising:
receiving a sequence of image frames;
determining from the sequence of image frames that a vehicle associated with the sequence of frames is stationary;
in response to determining that the vehicle is stationary, changing a technique for storing the sequence of image frames in a frame stack from a first technique to a second technique that is different from the first technique;
determining from the sequence of image frames that the vehicle is in motion;
in response to determining that the vehicle is in motion, changing the technique for storing the sequence of image frames in the frame stack from the second technique to the first technique; and
storing the sequence of image frames in the frame stack according to at least one of: the first technique and the second technique.

12. The method of claim 11, wherein the first technique is a first in, first out technique and the second technique is a last in, first out technique.

13. The method of claim 11, wherein the determining that the vehicle is stationary includes:
detecting an interest point within the sequence of image frames;
determining optical flow representing movement of the interest point between frames of the sequence of image frame; and
determining that the vehicle is stationary based on the optical flow.

14. The method of claim 11, wherein the determining that the vehicle is stationary includes:
performing triangulation using the sequence of image frames to determine a distance between an object and a camera from which the sequence of image frames is received; and
determining that the vehicle is stationary based on the triangulated distance.

15. The method of claim 11, wherein the determining that the vehicle is stationary includes:
determining a pose of a camera from which the sequence of image frames is received based on the sequence of image frames;
determining translation vectors for the sequence of image frames relating the pose to a reference position;
comparing a first difference between a subset of the translation vectors corresponding to consecutive frames of the sequence of image frames; and
determining that the vehicle is stationary based on the first difference.

16. The method of claim 15, wherein the determining that the vehicle is stationary further includes:
determining a second difference between a first translation vector corresponding to a most recently acquired frame of the sequence of image frames and a second translation vector corresponding to a last frame of the sequence of image frames acquired while the vehicle was moving; and
determining that the vehicle is stationary based on the second difference.

17. An automotive system on a vehicle comprising:
a camera configured to capture a sequence of image frames;

a structure from motion (SfM) system coupled to the camera, the SfM system comprising:
 a frame stack; and
 a processor coupled to the camera and the frame stack to:
  receive the sequence of image frames from the camera;
  determine that the vehicle is stationary;
  select a frame order for storing the sequence of image frames in the frame stack from between a first ordering technique and a second ordering technique based on a determination that the vehicle is stationary;
  store a subset of the sequence of image frames in the frame stack according to the selected frame order;
  compute a depth value based on the frame stack; and
  send, to a vehicle controller, the depth value; and
 the vehicle controller coupled to the SfM system, the vehicle controller configured to control operation of the vehicle based on the depth value.

18. The automotive system of claim 17, wherein:
the first ordering technique is a first in, first out technique;
the second ordering technique is a last in, first out technique; and
the processor is to select the second ordering technique as the frame order based on the determination that the vehicle is stationary.

19. The automotive system of claim 17, wherein:
the frame order is a first frame order;
the processor is further to:
 determine that the vehicle is in motion;
 select a second frame order for storing the sequence of image frames in the frame stack from between the first ordering technique and the second ordering technique based on a determination that the vehicle is in motion; and
the second frame order is different from the first frame order.

20. The automotive system of claim 17, wherein the processor is further to:
 estimate a pose of the camera;
 use the sequence of image frames to compute a set of translation vectors relating the pose of the camera to a reference position;
 determine a difference between a subset of the set of translations vectors corresponding to consecutive frames of the sequence of image frames; and
 determine that the vehicle is stationary based on the difference.

* * * * *